(12) United States Patent
Tanaka et al.

(10) Patent No.: US 7,950,039 B2
(45) Date of Patent: May 24, 2011

(54) MULTIMEDIA DATA TRANSMITTING APPARATUS AND MULTIMEDIA DATA RECEIVING APPARATUS

(75) Inventors: Michiko Tanaka, Osaka (JP); Toshihiko Munetsugu, Osaka (JP)

(73) Assignee: Panasonic Corporation, Osaka (JP)

( * ) Notice: Subject to any disclaimer, the term of this patent is extended or adjusted under 35 U.S.C. 154(b) by 474 days.

(21) Appl. No.: 12/062,001

(22) Filed: Apr. 3, 2008

(65) Prior Publication Data

US 2008/0250461 A1    Oct. 9, 2008

Related U.S. Application Data

(60) Provisional application No. 60/910,264, filed on Apr. 5, 2007.

(51) Int. Cl.
*G06F 3/00* (2006.01)
*H04N 7/173* (2006.01)

(52) U.S. Cl. ............ 725/86; 725/50; 725/89; 725/93; 725/100

(58) Field of Classification Search .......... 725/50, 725/89, 90, 91–93, 98, 100
See application file for complete search history.

(56) References Cited

U.S. PATENT DOCUMENTS

| | | | |
|---|---|---|---|
| 6,745,252 B1 * | 6/2004 | Yanagawa et al. | ............... 710/8 |
| 6,966,065 B1 | 11/2005 | Kitazato et al. | |
| 2001/0036269 A1 | 11/2001 | Morinaga et al. | |
| 2002/0021367 A1 | 2/2002 | Hirai et al. | |
| 2003/0226150 A1 | 12/2003 | Berberet et al. | |
| 2004/0078817 A1 * | 4/2004 | Horowitz et al. | ............... 725/58 |
| 2004/0103106 A1 | 5/2004 | Takaki et al. | |
| 2005/0223107 A1 | 10/2005 | Mine et al. | |
| 2006/0117370 A1 | 6/2006 | Kitazato et al. | |
| 2006/0152636 A1 | 7/2006 | Matsukawa et al. | |
| 2006/0211370 A1 | 9/2006 | Hasegawa et al. | |
| 2007/0033531 A1 * | 2/2007 | Marsh | ............... 715/738 |
| 2008/0069263 A1 | 3/2008 | Murakami et al. | |
| 2008/0095270 A1 | 4/2008 | Murakami et al. | |
| 2008/0120637 A1 | 5/2008 | Deiss | |
| 2010/0211974 A1 * | 8/2010 | Pedlow et al. | ............... 725/39 |

FOREIGN PATENT DOCUMENTS

| | | |
|---|---|---|
| EP | 1014620 A | 6/2000 |
| EP | 1148730 A | 10/2001 |
| EP | 1150497 A | 10/2001 |
| EP | 1703729 A | 9/2006 |
| JP | 11-507456 | 6/1999 |

(Continued)

OTHER PUBLICATIONS

English language Abstract of JP 2005-123734 A (May 12, 2005).

(Continued)

*Primary Examiner* — Kieu Oanh Bui
(74) *Attorney, Agent, or Firm* — Greenblum & Bernstein, P.L.C.

(57) ABSTRACT

To provide, in a multimedia content server which stores multimedia data and transmits the stored multimedia data to a terminal, a technique which allows the terminal to properly detect and process version up of section data even when random access for trick play, and the like, is performed. Upon receiving a data transmission request from a multimedia data receiving apparatus, a multimedia data transmitting apparatus transmits the requested multimedia data and notifies data necessary for obtaining an update-point of section data included in the multimedia data or a URI which enables the obtaining of the data, to the multimedia data receiving apparatus.

17 Claims, 18 Drawing Sheets

104 Multimedia content communication system

FOREIGN PATENT DOCUMENTS

| | | |
|---|---|---|
| JP | 2005-123734 A | 5/2005 |
| JP | 2006-261763 A | 9/2006 |
| WO | 96/412851 | 12/1996 |
| WO | 2006/034464 | 3/2006 |

OTHER PUBLICATIONS

English language Abstract of JP 2006-261763 A (Sep. 28, 2006).

Psannis et al., "A New Methodology for Implementing Interactive Operations of MPEG-2 Compressed Video," Digital and Computational Video, 2001, Proceedings, Second International Workshop on Feb. 8-9, 2001, Piscataway, NJ, USA, IEEE, Feb. 8, 2001, pp. 21-28, XP010547438.

Balabanian et al., "Digital Storage of Media-Command and Control Protocol Applied to ATM," IEEE Journal on Selected Areas in Communications, IEEE Service Center, Piscataway, US, vol. 14, No. 6, Aug. 1, 1996, pp. 1162-1172, XP011054513.

Tantaoui et al. "A Broadcast Technique for Providing Better VCR-Like Interactions in a Periodic Broadcast Environment," Globecom'02, 2002, IEEE Global Telecommunications Conference, Conference, Proceedings, Taipei, Taiwan, Nov. 17-21, 2002, New York, NY, IEEE, US, vol. 2, Nov. 17, 2002, pp. 1648-1652, XP010636423.

Balabanian et al., "An Introduction to Digital Storage Media-Command and Control," IEEE Communications Magazine, IEEE Service Center, Piscataway, US, vol. 34, No. 11, Nov. 1, 1996, pp. 122-127, XP000636135.

* cited by examiner

104 Multimedia content communication system

FIG. 6

|     | 601 | 602      | 603   | 604   | 605    | 606   |
|-----|-----|----------|-------|-------|--------|-------|
| 611 | 1   | News 9   | 9:00  | 10:30 | Mono   |       |
| 612 | 1   | Movie AAA| 10:30 | 12:00 | Stereo | Movie |
| 613 | 2   | Movie BBB| 9:00  | 11:00 | 5.1    | Movie |
| 614 | 2   | Soccer   | 11:00 | 12:00 | Mono   | Spo   |

FIG. 14

```
<ContentAttributes>
    <ContentID> 1 </ContentID>
    <FileName> 0001.m2ts </FileName>
    <FileTree> /DVR/Content/0001/Carousell/ </FileTree>
    <ChannelID> 1 </ChannelID>
    <ProgramNo> 101 </ProgramNo>
    <Title> Movie AAA </Title>
    <Genre> Movie </Genre>
    <Date> 2005/8/28 19:00 </Date>
    <RecordDate> 2005/8/28 19:00 </RecordDate>
    <PlaybackTime> 2 </PlaybackTime>
    <FormatType>MPEG2-TS</FormatType>
    <ContentType>video/mpeg</ContentType>
</ContentAttributes>
```

FIG. 16

| | 1602 | 1603 |
|---|---|---|
| 1611 → 1 | http://192.168.0.3/AVData/0001.m2ts | http://192.168.0.3VUP/0001-ait.vup |
| 1612 → 2 | http://192.168.0.3/AVData/0002.m2ts | http://192.168.0.3VUP/0002-ait.vup |
| 1613 → 3 | http://192.168.0.3/AVData/0003.m2ts | http://192.168.0.3VUP/0003-pmt.vup<br>http://192.168.0.3VUP/0003-ait.vup |

| | 1801 | 1802 | 1803 | 1804 | 1805 | 1806 | 1807 |
|---|---|---|---|---|---|---|---|
| 1811 | AIT | 1 | 10 | 10000 | 10010 | 100 | 11011001000100......111 |
| 1812 | AIT | 2 | 1000 | 30000 | 30010 | 50 | 11011001000100......111 |
| 1813 | AIT | 3 | 5000 | 50000 | 50010 | 65 | 11011001000100......111 |

MULTIMEDIA DATA TRANSMITTING APPARATUS AND MULTIMEDIA DATA RECEIVING APPARATUS

CROSS-REFERENCE TO RELATED APPLICATIONS

This application claims the benefit of U.S. Provisional Application No. 60/910,264, filed Apr. 5, 2007, the content of which is expressly incorporated by reference in its entirety.

BACKGROUND OF THE INVENTION (1) Field of the Invention

The present invention relates to the transmission and reception of digitalized multimedia content data on a network such as a home network.

(2) Description of the Related Art

In recent years, digital broadcasting such as BS digital broadcasting, CS 110-degree digital broadcasting, and digital terrestrial broadcasting has commenced. Furthermore, DVR for recording a TV-program in a recording medium for digital data such as a Hard Disk Drive (HDD), a Blu-Ray Disc (BD), and a Digital Versatile Disc (DVD) is becoming popular. With this, digitalized multimedia content that can be used in households is increasing.

Meanwhile, with the development of the broadband environment, internet access from households is becoming widespread. Accordingly, the spread of the so-called home network, in which the respective rooms in a house are connected by an IP network, is also advancing.

With such a situation, digital broadcasts received by a digital broadcast receiver in the house, or digital contents stored in a recorder can now be viewed at other rooms, using the home network.

With regard to such sharing of digital content using a home network, there is a move to make this possible not only between the above-mentioned CE devices, but also between all devices connected to a home network, including personal computers (PC) and Personal Digital Assistants (PDA). To be more specific, standardization organizations such as the Digital Living Network Alliance (DLNA) have laid-out and made public standards and implementing guidelines for this purpose.

In such content sharing, the method defined in the UPnP AV Architecture is widely used in the recognition of the devices and the exchange of information on the contents that can be used, between a server (for example, a set top box or DVR which receives digital broadcasts) and a client (for example, a personal computer or a digital player) in the home network. In UPnP AV, upon receiving an inquiry from the client, the server replies with a list of provided contents and the attributes of each of the contents. Furthermore, as a mandatory protocol for transmission of content data, Hypertext Transfer Protocol (HTTP) is used in DLNA.

In such sharing of content in a home network, for example, in the case of sharing a broadcast content among plural terminals using the network, it is necessary to follow a broadcast standard such as the ARIB Standard in Japan or the DVB Standard in Europe. In these standards, when outputting to a network, it is stipulated that the output format must be the Partial TS format. Furthermore, in a broadcast, version up of section data, which carries structure information within a stream and/or application information, notifies an update of information inside of the stream. In order to obtain such update information, it is necessary for the client to receive and analyze all the Partial TS on the server over the network.

However, when reproducing a recorded content via the network, it does not follow that the client necessarily receives all the data of the Partial TS of the content. For example, when the client carries out trick play of the content existing on the server, the client can use a method for selectively receiving and reproducing certain sections of the content. At this time, when there is an update-point such as a change of the structure in the stream and/or version up of section data, and the like, problems occur, such as not being able to correctly reproduce the stream and/or not being able to activate an application of the data broadcast.

SUMMARY OF THE INVENTION

In order to solve the aforementioned problems, the multimedia data transmitting apparatus of the present invention is a multimedia data transmitting apparatus which transmits stored multimedia data to a multimedia data receiving apparatus via a network, in response to a transmission request from the multimedia data receiving apparatus, the multimedia data transmitting apparatus includes: a storage unit in which the multimedia data and update-point information of a stream included in the multimedia data are stored; a request receiving unit which receives, from the multimedia data receiving apparatus, a transmission request message requesting for transmission of the multimedia data and transmission of the update-point information of the stream included in the multimedia data which are stored in the storage unit; an update-point information obtaining unit which obtains the update-point information of the stream, from the stream included in the multimedia data stored in the storage unit; and an information transmitting unit which transmits the requested multimedia data and the update-point information of the stream included in the multimedia data, to the multimedia data receiving apparatus.

According to this configuration, the multimedia data transmitting apparatus can transmit, to the multimedia data receiving apparatus, the update-point information of the stream included in the multimedia data, such as a version up of section data, and can thus notify the multimedia data receiving apparatus of the update-point information of the stream included in the multimedia data.

Furthermore, the update-point information obtaining unit includes: an update-point detecting unit which detects the update-point information of the stream included in the multimedia data; and an update-point storage unit in which the update-point information of the stream detected by the update-point detecting unit is stored, and the update-point detecting unit detects, when the multimedia data is to be stored, the update-point information of the stream included in the multimedia data to be stored.

According to this configuration, the multimedia data transmitting apparatus can transmit the update-point information that is detected in advance during the storage of multimedia data, when a transmission request message requesting the transmission of multimedia data stored in the storage unit and the transmission of the update-point information of a stream included in the multimedia data is received from the multimedia data receiving apparatus.

Furthermore, the update-point information obtaining unit includes: an update-point detecting unit which detects the update-point information of the stream included in the multimedia data; and an update-point storage unit in which the update-point information of the stream, detected by the update-point detecting unit, is stored, and the update-point detecting unit detects, when the transmission request message is received, the update-point information of the stream included in the multimedia data to be stored.

According to this configuration, since it is not necessary for the multimedia data transmitting apparatus to detect update-point of a stream included in multimedia data that is not requested by the multimedia data receiving apparatus, the detection time and memory needed for the update-point information of the stream included in the multimedia that is not required can be reduced.

Furthermore, the update-point information of the stream includes: update details of first data representing a structure of the stream included in the multimedia data; and either position information or time information indicating the position or the time in the stream at which the update details of the first data become valid.

According to this configuration, the multimedia data transmitting apparatus can transmit, to the multimedia data receiving apparatus, update details of first data representing a structure of the stream included in the multimedia data, and either the position information or the time information indicating the position or the time in the stream at which the update details of the first data become valid.

Furthermore, when the request receiving unit receives the transmission request message from the multimedia data receiving apparatus, the update-point information obtaining unit obtains the update-point information of the stream included in the multimedia data, and the information transmitting unit transmits the obtained update-point information of the stream.

According to this configuration, multimedia data transmitting apparatus can transmit the update-point information of the stream conforming to the transmission request message from the multimedia data receiving apparatus.

Furthermore, in the case where the request receiving unit receives the transmission request message specifying a reproduction speed that is faster than a normal reproduction speed, the information transmitting unit: transmits, to the multimedia data receiving apparatus, portions of the stream included in the multimedia data, as a stream that is required for reproduction according to the reproduction speed that is faster than the normal reproduction speed; and transmits the update-point information of the stream included in the multimedia data, when the reproduction speed specified in the transmission request message for the multimedia data becomes the normal reproduction speed.

According to this configuration, the multimedia data transmitting apparatus can definitely transmit, to the multimedia data receiving apparatus, update-point information that is not included in the transmitted portion of the stream. Furthermore, upon returning from trick play to normal reproduction, the multimedia data receiving apparatus can definitely perform normal reproduction based on the update-point information received from the multimedia data transmitting apparatus.

Furthermore, in the case where the request receiving unit receives the transmission request message specifying a reproduction speed that is faster than a normal reproduction speed, the information transmitting unit: transmits, to the multimedia data receiving apparatus, portions of the stream included in the multimedia data, as a stream that is required for reproduction according to the reproduction speed that is faster than the normal reproduction speed; and transmits the update-point information of the stream included in the multimedia data, before the reproduction speed specified in the transmission request message for the multimedia data becomes the normal reproduction speed.

According to this configuration, the multimedia data transmitting apparatus can definitely transmit, to the multimedia data receiving apparatus, update-point information that is not included in the transmitted portion of the stream. Furthermore, the multimedia data receiving apparatus can definitely perform normal reproduction based on the update-point information received from the multimedia data transmitting apparatus, even during trick play.

Furthermore, the information transmitting unit further transmits reference information for the update-point information of the stream stored by the multimedia data transmitting apparatus.

According to this configuration, the multimedia data receiving apparatus can use the reference information at the timing in which the multimedia data receiving apparatus requires the update-point information, and obtain the update-point information of the stream stored by the multimedia data transmitting apparatus.

Furthermore, the update-point information to be transmitted to the multimedia data receiving apparatus is difference data indicating a difference, before updating and after updating, in data of which details are updated over time, among data other than an audio stream and a video stream.

According to this configuration, the multimedia data receiving apparatus can obtain the updated data immediately by merely referring to the difference data received from the multimedia data transmitting apparatus.

Furthermore, the update-point information to be transmitted to the multimedia data receiving apparatus represents information which has been updated within the stream.

According to this configuration, the multimedia data receiving apparatus can process data received from the multimedia data transmitting apparatus, in the same manner as when obtaining from a stream of multimedia data.

Furthermore, the update-point information of the stream includes: the update details of the first data representing the structure of the stream for specific sections included in the multimedia data to be transmitted by the information transmitting unit; and either the position information or the time information indicating the position or the time in the stream at which the update details of the first data become valid.

According to this configuration, the multimedia data receiving apparatus does not need to find the update-point information for a required specific section from all the update-point information of the stream included in the multimedia data, and can receive: only the update details of the first data occurring in the specific section required by the multimedia data receiving apparatus; and either the position information or the time information indicating the position or the time in the stream at which the update details of the first data become valid.

Furthermore, the update-point information of the stream includes: the update details of the first data representing the structure of the stream for the specific section included in the multimedia data, specified in the transmission request message; and either the position information or the time information indicating the position or the time in the stream at which the update details of the first data become valid.

According to this configuration, the multimedia data receiving apparatus does not need to find the update-point information for a required specific section from all the update-point information of the stream included in the multimedia data, and can receive: the update details of the first data occurring in the specific section required by the multimedia data receiving apparatus; and either the position information or the time information indicating the position or the time in the stream at which the update details of the first data become valid.

Furthermore, the transmission request message from the multimedia data receiving apparatus includes information for requesting transmission of the update-point information of the stream.

According to this configuration, there is no need to issue a transmission request for update-point information again in the case where the multimedia data receiving apparatus requires update-point information, and thus the load on the network can be reduced.

Furthermore, the information transmitting unit transmits the update-point information of the stream by including the update-point information in a response message to the transmission request message from the multimedia data receiving apparatus.

According to this configuration, update-point information does not need to be transmitted, from the multimedia data transmitting apparatus, separately from the multimedia data, and thus the load on the network can be reduced.

Furthermore, the update-point information of the stream includes: update details of second data representing application structure information for implementing a data broadcast included in the multimedia data; and either position information or time information indicating a position or a time in the stream at which the update details of the second data become valid.

According to this configuration, the multimedia data transmitting apparatus can transmit, to the multimedia data receiving apparatus: the update details of second data representing application structure information for implementing a data broadcast included in the multimedia data; and either the position information in or time information indicating the position or the time in the stream at which the update details of the second data become valid.

Furthermore, the update-point information of the stream includes: the update details of the second data representing the application structure information for implementing a data broadcast included in specific sections of the multimedia data to be transmitted by the information transmitting unit; and either the position information within the stream and the time information indicating the position or the time in the stream at which the update details of the second data become valid.

According to this configuration, the multimedia data receiving apparatus does not need to find the update-point information for a required specific section from all the update-point information of the stream included in the multimedia data, and can receive: the update details of the second data occurring in the specific section required by the multimedia data receiving apparatus; and either the position information or the time information indicating the position or the time in the stream at which the update details of the second data become valid.

Furthermore, the update-point information of the stream includes: the update details of the second data representing application structure information for implementing a data broadcast included the specified sections of the multimedia data, the sections are specified in the transmission request message; and either the position information or the time information indicating the position or the time in the stream at which the update details of the second data become valid.

According to this configuration, the multimedia data receiving apparatus does not need to find the update-point information for a required specific section from all the update-point information of the stream included in the multimedia data, and can receive: the update details of the second data occurring in the specific section required by the multimedia data receiving apparatus; and either the position information or the time information indicating the position or the time in the stream at which the update details of the second data become valid.

Furthermore, the multimedia data transmitting apparatus further includes: a Java™ executing unit which executes a Java application; and a configuration changing unit which causes a configuration of the update-point information of the stream to change, according to an instruction from the Java application.

According to this configuration, the configuration of the update-point information can be changed according to the instruction of the Java application.

Next, the multimedia data receiving apparatus according to the present invention receives multimedia data and update-point information of a stream included in the multimedia data, from a multimedia data transmitting apparatus, the multimedia data receiving apparatus includes: a receiving unit which receives the multimedia data and the update-point information of the stream included in the multimedia data; and a reproducing unit which controls starting or changing of a reproduction processing for the received multimedia data, according to the received update-point information of the stream.

According to this configuration, the multimedia data receiving apparatus can use the multimedia data and the update-point information received from the multimedia data transmitting apparatus, and it becomes possible to properly reproduce the updated details of the multimedia data even on the multimedia data receiving apparatus.

Furthermore, the receiving apparatus receives the update-point information included in a response message to a transmission request message for the multimedia data, received from the multimedia data transmitting apparatus.

According to this configuration, the multimedia data receiving apparatus can immediately apply the update in the stream of the received multimedia data and perform reproduction, by using the update details, and either the position information or the time information indicating the position or the time in the stream at which the update details become valid, that are included in the stream of the received multimedia data.

Furthermore, the multimedia data receiving apparatus further includes a transmitting unit which transmits a transmission request message for requesting transmission of the multimedia data and transmission of the update-point information of the stream included in the multimedia data, wherein the receiving unit receives the multimedia data and the update-point information of the stream, through transmission of the transmission request message from the transmitting unit to the multimedia data transmitting apparatus.

According to this configuration, the multimedia data receiving apparatus can transmit a transmission request message for update-point information of a stream included in the multimedia data, as needed in the multimedia data receiving apparatus, and receive the multimedia and the update-point information of a stream included in the multimedia data.

Furthermore, the multimedia data receiving apparatus further includes: a Java executing unit which executes a Java application; and an update-point notifying unit which notifies the Java application of the received update-point information of the stream, the Java application being executed by the Java executing unit, wherein the reproducing unit starts or changes a reproduction processing for the multimedia data depending on the received update-point information of the stream, according to an instruction from the Java application.

According to this configuration, the processing for an update-point of the stream can be switched by the Java application.

As described above, according to the multimedia data transmitting apparatus and the multimedia data receiving apparatus of the present invention, a stream update-point can be detected even in the case where specific sections are selected, received and reproduced, as in the case where a client performs trick play of content on a server. With this, content reproduction including trick play and activation of an application provided through data broadcast can be correctly performed even on the client.

FURTHER INFORMATION ABOUT TECHNICAL BACKGROUND TO THIS APPLICATION

As further information about the technical background to this application, the disclosure of U.S. Provisional Application No. 60/910,264 filed Apr. 5, 2007, including specification, drawings and claims, is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 6 is a diagram showing an example of information stored in the second memory 203 of the present invention;

FIG. 14 is a diagram showing an example of the attribute information of multimedia data in the embodiment of the present invention;

FIG. 16 is a diagram showing an example of the URI table in the embodiment of the present invention;

FIG. 18 is a diagram showing an example of update-point information stored by the Rec 405*j*;

DESCRIPTION OF THE PREFERRED EMBODIMENT(S)

Hereinafter, the embodiment of the present invention shall be described with reference to the drawings.

Embodiment

Figure 1:
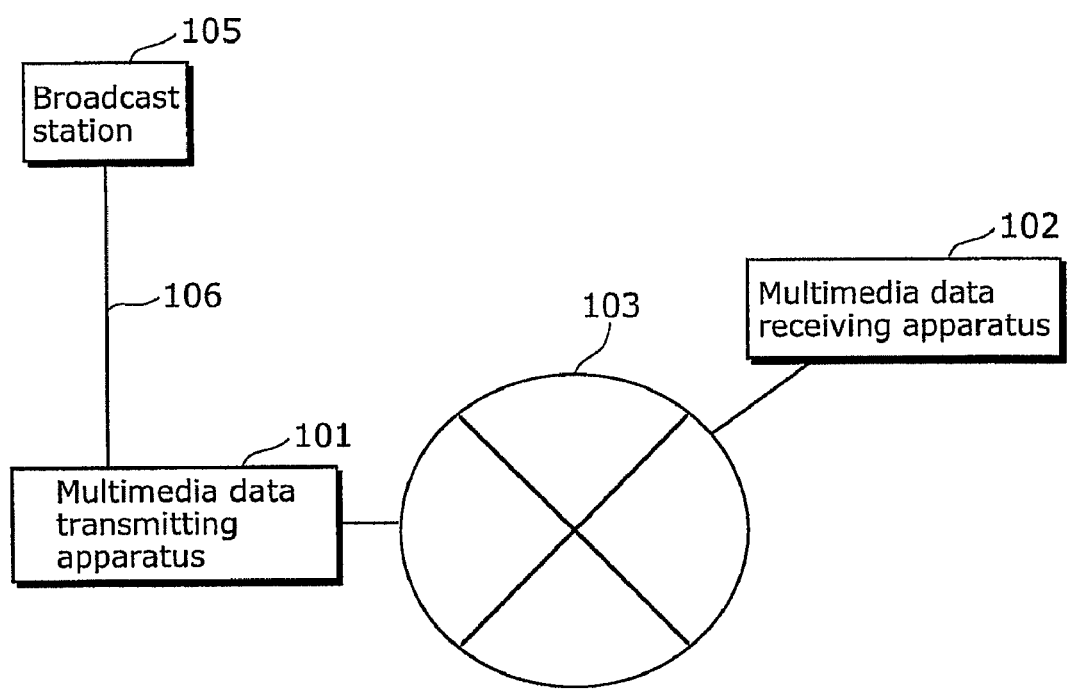
FIG. 1 is a configuration diagram for the multimedia content delivery system in the embodiment of the present invention.

FIG. 1 is a configuration diagram for the multimedia content communication system in the embodiment of the present invention. In FIG. 1, 101 denotes a multimedia data transmitting apparatus in the present invention, 102 denotes a multimedia data receiving apparatus in the present invention, 103 denotes a network, and 104 denotes a multimedia content communication system made up of these elements. The multimedia data transmitting apparatus 101 and the multimedia data receiving apparatus 102 are connected to the network 103, and can communicate with each other via the network 103. In addition, 105 denotes a cable television broadcast station, 106 denotes a cable connecting the multimedia data transmitting apparatus 101 and the broadcast station 105.

The multimedia data transmitting apparatus 101 in the present embodiment is a CATV Set Top Box (STB) which includes a network interface and a storage unit for storing multimedia data. The multimedia data transmitting apparatus 101 is connected to the broadcast station 105 via the cable 106. In addition, the multimedia data transmitting apparatus 101 stores the multimedia data of a digital broadcast content received from the broadcast station 105, in the storage unit. Furthermore, the multimedia data transmitting apparatus 101 is connected to the network 103 via the network interface. In addition, the multimedia data transmitting apparatus 101 receives, through the network 103, requests transmitted from the multimedia data receiving apparatus 102. The multimedia data transmitting apparatus 101 transmits, in response to the request from the multimedia data receiving apparatus 102, the multimedia data of the digital broadcast content received from the broadcast station 105, or information about stored multimedia data, to the multimedia data receiving apparatus 102, through the network 103.

Moreover, the digital broadcast content stored by the multimedia data transmitting apparatus 101 in the storage unit is data in the MPEG-2-TS format.

The multimedia data receiving apparatus 102 transmits a transmission request for a list of contents that can be provided, to the multimedia data transmitting apparatus 101, according to a user's request. Then, it receives a list of contents from the multimedia data transmitting apparatus 101 as a response to the request, and presents the list to the user. In addition, the multimedia data receiving apparatus 102 transmits, to the multimedia data transmitting apparatus 101, a transmission request for the multimedia data of a content selected by the user. The multimedia data receiving apparatus 102 receives multimedia data as a response to the request, and reproduces the received data, and then presents it to the user. In addition, upon receiving a request for trick play such as fast-forward, reverse, and the like from the user, the multimedia data receiving apparatus 102 implements the trick play by: once stopping the communication of multimedia data; successively issuing, anew, transmission requests for parts necessary in the trick play; each time receiving and reproducing multimedia data The network 103 is a home network established in the household, and is an IP network configured of the Ethernet, wireless LAN, and so on.

Hereinafter the communication and respective operations of the multimedia data transmitting apparatus 101 and the multimedia data receiving apparatus 102 shall be described.

When connected to the network 103, the multimedia data transmitting apparatus 101, which is a multimedia data server, notifies other devices that it is a server that can provide services, by broadcasting such information to the network 103. In addition, according to a request from another device connected to the network 103, the multimedia data transmitting apparatus 101 transmits the information of services provided by the multimedia transmitting apparatus 101 and the access methods of each service to the request-source apparatus. When connected to the network 103, the multimedia data receiving apparatus 102, searches for server devices connected to the network 103, and obtains what functions each of the server devices have. Since these communications are carried out as defined by the UPnP Device Architecture (DA), in the same manner as with DLNA, detailed description shall be omitted. With this, the multimedia data receiving apparatus 102 can recognize that the multimedia data transmitting apparatus 101 is a multimedia server which is connected to the network 103.

Hereinafter, the communication of multimedia data between the multimedia data transmitting apparatus 101 and the multimedia data receiving apparatus 102 shall be described in sequence.

First, the multimedia data receiving apparatus 102 issues a transmission request for a list of contents that can be provided, to the multimedia data transmitting apparatus 101. Then, upon receiving the request, the multimedia data transmitting apparatus 101 retrieves the contents that can be provided, and replies to the multimedia data receiving apparatus 102, with the list. This communication can be carried out using the Browse or Search of the UPnP AV Content Directory Service (CDS), and thus detailed description shall be omitted.

Upon receiving, from the multimedia data receiving apparatus 102, the transmission request for the list of contents that can be provided, to the multimedia data transmitting apparatus 101 replies with a list of contents stored in the storage unit. Since a list defined by the UPnP AV or DLNA can be used for the list to be transmitted, detailed description shall be omitted.

Receiving the provided content list, the multimedia data receiving apparatus 102 presents this list to the user. Then, the multimedia data receiving apparatus 102 requests, to the multimedia data transmitting apparatus 101, the transmission of multimedia data of the content selected by the user. The multimedia data transmitting apparatus 101 reads the requested content data from the storage unit, and transmits this to the multimedia data receiving apparatus 102. In the communication of the multimedia, communication is performed using HTTP which is a mandatory protocol in DLNA.

Here, when trick play is requested by the user, the multimedia data receiving apparatus 102 implements trick play by repeating: judging the necessary data sections according to the type of trick play such as fast-forward, reverse, slow; receiving and reproducing data of only such sections; and displaying the reproduced data. As such, when trick play is implemented, there are cases where the multimedia data receiving apparatus 102 cannot obtain all the TS packets of the multimedia data. In this case, for example, even when the update occurs, such as version up, in the information within the multimedia data such as a table representing TV-program composition necessary for reproduction or a table representing data broadcast applications, the multimedia data receiving apparatus cannot detect such updates. Therefore, there occur instances such as not being able to perform reproduction correctly or not being able to activate or run the data broadcast application. Consequently, the multimedia data receiving apparatus 102 requests for the transmission of update-point information to the multimedia data transmitting apparatus 101.

Such communication can be carried out as follows.

It is assumed that the Uniform Resource Identifier (URI) of the multimedia data is http://192.168.0.3/AVData/0001.m2ts. In addition, the request for the update-point information for the information within the multimedia data is performed by adding an extension header X-Version-Request to the HTTP request. In the extension header X-Version-Request, the type of the update-point within the multimedia data that is requested, and the scope of occurrence of the update-point whose transmission is requested, are delimited by a semicolon ";". Furthermore, it is assumed that "type" is used as a specifier indicating the type of the update-point, and this is specified as "type=xx". As an example of the types of the update-point within the multimedia data whose transmission is requested, the table representing TV-program composition is specified as si, and the table representing data broadcast applications is specified as ait. Furthermore, it is assumed that for the scope of occurrence of the update-point whose transmission is requested, a specifier "scope" is used and specifying is carried out as "scope=yy". In the case where a transmission request for all the update-points within the multimedia data is issued, this is specified as "all". Specifying of the transmission request scope shall be described later. For example, in the case where a transmission request for version information of a table representing data broadcast applications is issued for the whole of the multimedia data, the following extension header X-Version-Request is used.

X-Version-Request: type=ait ; scope=all

Therefore, an HTTP request such as in the example below is issued from the multimedia data receiving apparatus 102 to the multimedia data transmitting apparatus 101.

GET http://192.168.0.3/AVData/0001.m2ts HTTP/1.1
Host: 192.168.0.3
Date: Thr Jan 11 15:00:00 2007 GMT User-Agent: AVT Client
Connection: Keep-Alive
X-Version-Request: type=ait ; scope=all Upon receiving this HTTP request, the multimedia data transmitting apparatus 101, together with transmitting the multimedia data to the multimedia data receiving apparatus 102, detects the update-point information for the specified scope from the requested multimedia data, and transmits the detected update-point information to the multimedia data receiving apparatus 102.

Here, the multimedia data transmitting apparatus 101 replies by indicating the URI where the update-point information of the multimedia data is provided, using an extension header X-Version-Info of the HTTP response. As its values, the extension header X-Version-Info indicates the type of the information notifying the update-point by using the specifier "type", and indicates the URI providing the update-point information by using a specifier "url". For example, in the case of the response for the abovementioned request, when the URI providing the update-point is http://192.168.0.3/VUP/0001-ait.vup, the extension header X-Version-Info is as follows.

X-Version-Info: type=ait; url=http://192.168.0.3/VUP/0001-ait. vup

When the process is finished normally, the response is issued using 200 OK as a response code. Therefore, the response to the abovementioned request is as follows.

HTTP/1.1 200 OK
Date: Thr Jan 11 15:00:01 2007 GMT
Server: AVT Server
Connection: Keep-Alive
Content-Type: video/mpeg
Content-Length: 47952
X-Version-Info: type=ait; url=http://192.168.0.3/VUP/0001-ait.vup
(Empty line)
[47952-byte data]

Furthermore, although a response is carried out using 200 OK as a response code when another error involving HTTP does not occur in the case where the type specified by "type" is incorrect with regard to the value of X-Version-Request in the request, the value of the extension header X-Version-Info is specified as an "Invalid type" notifying an incorrect request. For example, a response such as below is issued.

HTTP/1.1 200 OK
Date: Thr Jan 11 15:00:01 2007 GMT
Server: AVT Server
Connection: Keep-Alive
Content-Type: video/mpeg
Content-Length: 47952
X-Version-Info: Invalid type
(Empty line)
[47952-byte data]

Furthermore, although a response is carried out using 200 OK as a response code when another error involving HTTP does not occur in the case where the type specified in the "scope" is incorrect with regard to the value of X-Version-Request in the request, the value of the extension header X-Version-Info is specified as an "Invalid scope" notifying an incorrect request. For example, a response such as below is issued.

HTTP/1.1 200 OK
Date: Thr Jan 11 15:00:01 2007 GMT
Server: AVT Server
Connection: Keep-Alive
Content-Type: video/mpeg
Content-Length: 47952
X-Version-Info: Invalid scope
(Empty line)
[47952-byte data]

Furthermore, in the case where the received HTTP request includes an error concerning an HTTP other than that which was extended, such as when multimedia data corresponding to the requested URI does not exist, a response corresponding to the error is issued. In this case, even for the request including the X-Version-Request, the response does not include X-Version-Info.

Note that, here, any format is acceptable for the data that can be obtained from the resource specified by the URI specified in the X-Version-Info as long as both the multimedia data transmitting apparatus 101 and the multimedia data receiving apparatus 102 can get the same interpretation. Data written in chart form, data written in XML, binary section data, and the like are given as examples.

Furthermore, here, a method is described in which, due to the registration, in the HTTP request, of an extension X-Version-Request by the multimedia data receiving apparatus 102, the multimedia data transmitting apparatus 101 responds by adding an extension header X-Version-Info to the HTTP response. However, it is also possible to have an embodiment in which the update-point information is notified from the multimedia data transmitting apparatus 101 through the extension header X-Version-Info, without an explicit request for the update-point information being issued from the multimedia data receiving apparatus 102.

Furthermore, a method that appends, to the extension header X-Version-Info of the HTTP response, the update-point information in a stream is also acceptable. A method which indicates the size of actual data in "length", and specifies the binary information of section data in "bytes" is given as an example. Furthermore, aside from this, a method which specifies the information converted into the text instead of binary information is also acceptable.

X-Version-Info: type=ait; length=100; bytes=1101100100 01001 . . . 1111

Furthermore, a method that specifies, in the extension header X-Version-Info of the HTTP response, the range specifying the byte position of multimedia data where there is the section data which transmits update-point information of the stream is also acceptable. As an example, the type of the section data is indicated by the "type" specifier and, in such type, the table representing the TV-program composition is specified as si or the table representing data broadcast applications is specified as ait. Furthermore, the range of the byte positions for transmitting section data is specified using a "bytes" specifier, with the beginning of the multimedia data being assumed as 0. Note that the range of the byte positions may also be specified by the packet number of TS packets. This can be easily calculated since a TS packet has a fixed length of 188 bytes.

X-Version-Info: type=ait; bytes=5000-10000

In addition, upon being notified of the range of the byte positions for transmitting the section data, the multimedia data receiving apparatus 102 can obtain the section data including the update-point information by issuing the multimedia data transmitting request again which specifies the specified range of the byte positions.

Note that although a method that individually indicates the table representing TV-program composition (si) and the table representing data broadcast applications (ait) is described here, a method that handles all the update-points in the multimedia data collectively is also acceptable. For example, between the multimedia data transmitting apparatus 101 and the multimedia data receiving apparatus 102, it is possible that the multimedia data transmitting apparatus 101 notifies, as one update-point information, all the update-points of the section data, such as si and ait, in the scope specified in the multimedia data when the value of "type" is specified as "all" in the extension header X-Version-Request.

Furthermore, although in the above description, a method in which the entire multimedia data is subject to the occurrence scope of the update-point information to be obtained, it is also possible to have a method in which, when an update-point occurs within a certain scope of the multimedia data, such update-point information is notified. For example, the specifying of the update-point transmission request scope, in the extension header X-Version-Request, may be specified with the byte position from the beginning of the multimedia data. This can be specified in the "scope" identifier by indicating the start point and end point with byte positions having 0 as the beginning of the stream, and connecting these with a hyphen. Furthermore, in the case where the end point is omitted, it is assumed that the scope is specified up to the end of the multimedia data. However, it is not possible to designate a plurality of scopes at the same time. For example, when it is assumed that the transmission start requested position of the requested scope of the update-points within the multimedia data is the 47940th byte, with the beginning of the multimedia data as 0; and the transmission end requested position is the 95879th byte, with the beginning of the multimedia data as 0; and the type of the requested update-point is the table representing data broadcast applications, the extension header is as follows.

X-Version-Request: type=ait; scope=47940-95879

Furthermore, in the case of requesting the information of the update-points of for the table representing the data broadcast applications, occurring up to the 47940th byte from the beginning of the multimedia data, the extension header is as follows.

X-Version-Request: type=ait; scope=0-47940

Furthermore, in the case of requesting the information of the update-points of for the table representing the data broadcast applications, occurring from the 47940th byte up to the end of the multimedia data, the extension header is as follows.

X-Version-Request: type=ait; scope=47940-

In this manner, the HTTP response concerning the request including the extension header can be issued in the same format as the above-described response.

Note that although in the present embodiment the specifying of the occurrence scope of the update-points for which the transmission request is issued is specified using the byte positions in the multimedia data, the same effect can be obtained even with a method which specifies the elapsed time from the beginning of the content of the multimedia data.

Furthermore, by receiving the update-point information of the table representing the data broadcast applications (ait), the multimedia data receiving apparatus 102 is able to detect the updates in the management information of an application. Therefore, the activation and termination of an application becomes possible on the multimedia data receiving apparatus 102. At this time, the files of the application may be multiplexed in multimedia data and sent from the multimedia data transmitting apparatus 101 to the multimedia data receiving apparatus 102, and extracted from the received multimedia data on the multimedia data receiving apparatus 102, or it may be sent from the multimedia data transmitting apparatus 101 to the multimedia data receiving apparatus 102, separately from the multimedia data. The following shows, in the case of the latter, an example of a method in which the multimedia data receiving apparatus 102 obtains the files of the application from the multimedia data transmitting apparatus 101.

First, the multimedia data receiving apparatus 102 requests the multimedia data transmitting apparatus 101 for the information about the place where the files are stored. Here, it is assumed that the base directory is requested. This is set in the header of an HTTP request requesting the multimedia data, by using an extension header X-Tree-Base-Request such as the one below.

X-Tree-Base-Request: carousel_id=1

The HTTP request including this header is as in the example below.

GET http://192.168.0.3/AVData/0001.m2ts HTTP/1.1
Host: 192.168.0.3
Date: Thr Jan 11 15:00:00 2007 GMT
User-Agent: AVT Client
Connection: Keep-Alive
X-Tree-Base-Request: carousel_id=1

Upon receiving such HTTP request, the multimedia data transmitting apparatus 101 describes the directory in which the file tree of the application is stored, in the header of the HTTP response, using an extension header X-Tree-Base-Info, and transmits the response. An example of the X-Tree-Base-Info header is given below.

X-Tree-Base-Info: directory=/DVR/Content/0001/Carousel1/

In addition, an example of the HTTP response including the X-Tree-Base-Info header is given below.

HTTP/1.1 200 OK
Date: Thr Jan 11 15:00:01 2007 GMT
Server: AVT Server
Connection: Keep-Alive
Content-Type: video/mpeg
Content-Length: 47952
X-Tree-Base-Info: directory=/DVR/Content/0001/Carousel1/
(Empty line)
[47952-byte data]

In the case of obtaining a file from the multimedia data transmitting apparatus 101, the multimedia data receiving apparatus 102 receiving this response is able to obtain the file since it is possible to identify the file by concatenating the obtained file directory and a file path and specifying with it. For example, when the path from the root directory of the HTTP server on the multimedia data transmitting apparatus 101 is returned by X-Tree-Base-Info, and in the case where it is assumed that the obtained base directory is "/DVR/Content/0001/Carousel1/", the base directory of the application is "/", and the relative path from the base directory of the application is "TestXlet1.class", the multimedia data receiving apparatus 102 can receive the file from the multimedia data transmitting apparatus 101 by requesting "http://192.168.0.3/DVR/Content/0001/Carousel1/TestXlet1.class" to the multimedia data transmitting apparatus 101.

Furthermore, the same effect can be obtained even with a method in which the directory which is permitted to be mounted by Network File System (NFS) is notified by the X-Tree-Base-Info and the files are accessed by performing a network mount to the notified directory For example, by performing an NFS mount of the disk or directory on the multimedia data transmitting apparatus 101, that is indicated by "/DVR/Content/0001/Carousel1/" notified by X-Tree-Base-Info, the multimedia data receiving apparatus 102 can access the files under the directory.

Hereinafter, the multimedia data transmitting apparatus 101 and the multimedia data receiving apparatus 102 included in the multimedia content communication system 104 shall be described in more detail.

First, the multimedia data transmitting apparatus 101 shall be described.

Figure 2:
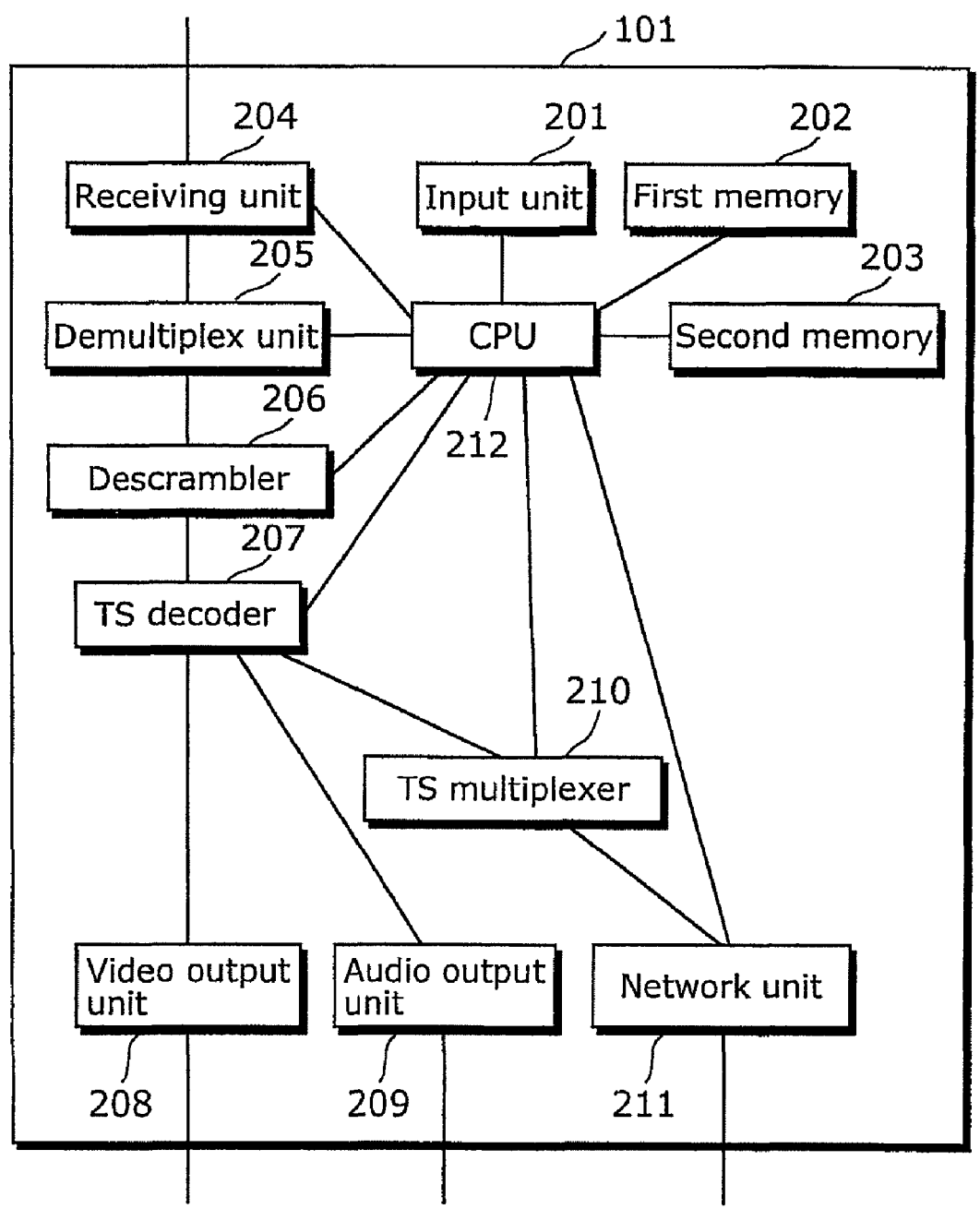
FIG. 2 is a configuration diagram for the multimedia data transmitting apparatus 101 in the embodiment of the present invention.

FIG. 2 is a block diagram showing the relationship of constituent elements included in the multimedia data transmitting apparatus 101 in the present embodiment. The multimedia data transmitting apparatus 101 includes an input unit 201, a first memory 202, a second memory 203, a receiving unit 204, a demultiplex unit 205, a descrambler 206, a TS decoder 207, a video output unit 208, an audio output unit 209, a TS multiplexer 210, a network unit 211, and a CPU 212.

Figure 3:
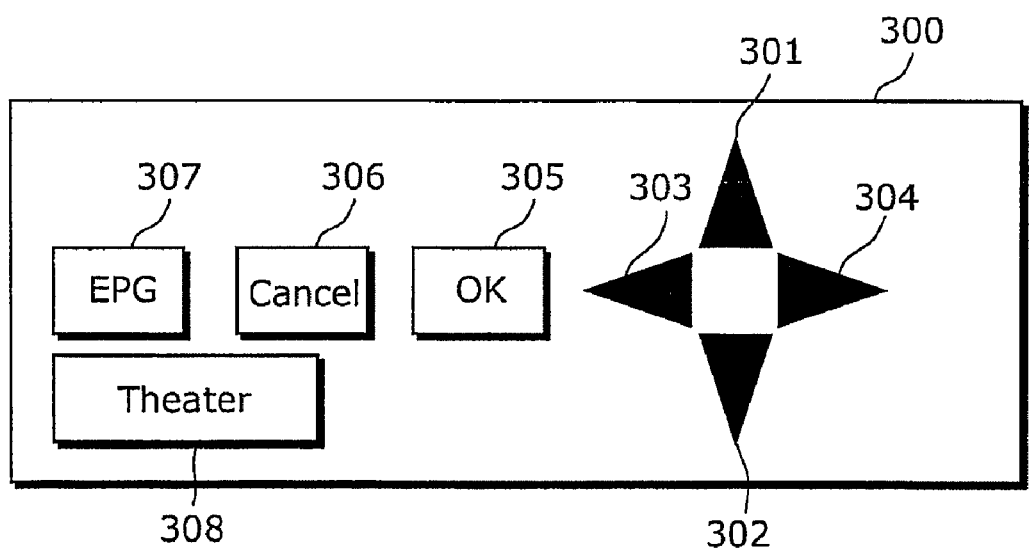
FIG. 3 is a diagram showing an example of an external view in the case where the input unit 201 is configured of a front panel.

The input unit 201 is configured of a front panel, remote control signal receiver, and the like, and accepts an instruction, such as a channel selection, from a user. FIG. 3 shows an example of the input unit 201 in the case where it is configured of a front panel. 300 is a front panel configured of 8 buttons, namely, an up-cursor button 301, a down-cursor button 302, a left-cursor button 303, a right-cursor button 304, an OK button 305, a cancel button 306, an EPG button 307, and a theater button 308. When the user presses down a button, the identifier of such pressed button is notified to the CPU 212.

The first memory 202 is configured of a RAM, or the like, and is used when the CPU 212 temporarily stores data.

The second memory 203 is configured of a device that can hold information even when power is turned off, such as a flash memory, a hard disk, or the like, and stores a program executed by the CPU 212. For the second memory, a detachable storage device such as an SD memory card and the like may also be used.

The receiving unit 204 is connected to the cable from a CATV station from which it receives broadcast waves. The receiving unit 204 tunes to the frequency specified by the CPU 212, extracts an MPEG transport stream and passes the extracted MPEG transport stream to the demultiplex unit 205.

The demultiplex unit 205 receives the MPEG transport stream from the receiving unit 204, extracts information specified by the CPU 212 and passes it to the CPU 212. In addition, it passes the MPEG transport stream to the descrambler 206 as it is.

The descrambler 206 descrambles (=decrypts) the scrambled MPEG transport stream provided by the demultiplex unit 205, and passes the descrambled MPEG transport stream to the TS decoder 207. The descrambler 206 may be a module built-into the multimedia data transmitting apparatus 101, and may also be implemented through the CableCARD™ introduced in North American cable receivers. The specifications of CableCARD is described in the CableCARD Interface Specification laid out by the CableLabs in the United States, and thus description is omitted herein.

The TS decoder 207 receives, from the CPU 212, identifiers of audio data, video data and section data such as PSI/SI information and so on. In addition, the TS decoder 207 extracts, from the descrambled stream received from the descrambler 206, data corresponding to the received identifiers of audio data, video data, and section data such as PSI/SI information, and so on, and passes the extracted video data to the video output unit 208, and the audio data to the audio output unit 209. Furthermore, the TS decoder 207 passes both the extracted video data and audio data, as well as the section data, to the TS multiplexer 210.

The video output unit 208, which includes a video output terminal, converts the received video data to video data that complies with the terminal and outputs this. An example of the terminal is a composite cable terminal, and so on.

The audio output unit 209, which includes an audio output terminal, converts the received audio data to audio data that complies with the terminal and outputs this. Examples of the terminal are earphone terminals, a composite cable terminal, and so on.

The TS multiplexer 210 configures an MPEG2 transport stream from the received video data, audio data, and section data, and passes the MPEG2 transport stream to the network unit 211. The PSI/SI information can be rewritten as necessary.

The network unit 211, which includes a network interface, converts the data received from the CPU 212 into a signal that is in accordance with the physical media of the network to which the network interface is connected to, and outputs this signal. Furthermore, the network unit 211 receives a signal from the network interface, converts the signal into a packet defined by the IP network, and passes the packet to the CPU 212.

The CPU 212 controls the receiving unit 204, the demultiplex unit 205, the descrambler 206, the TS decoder 207, the TS multiplexer 210, and the network unit 211 by executing a program stored in the second memory 203.

Figure 4:
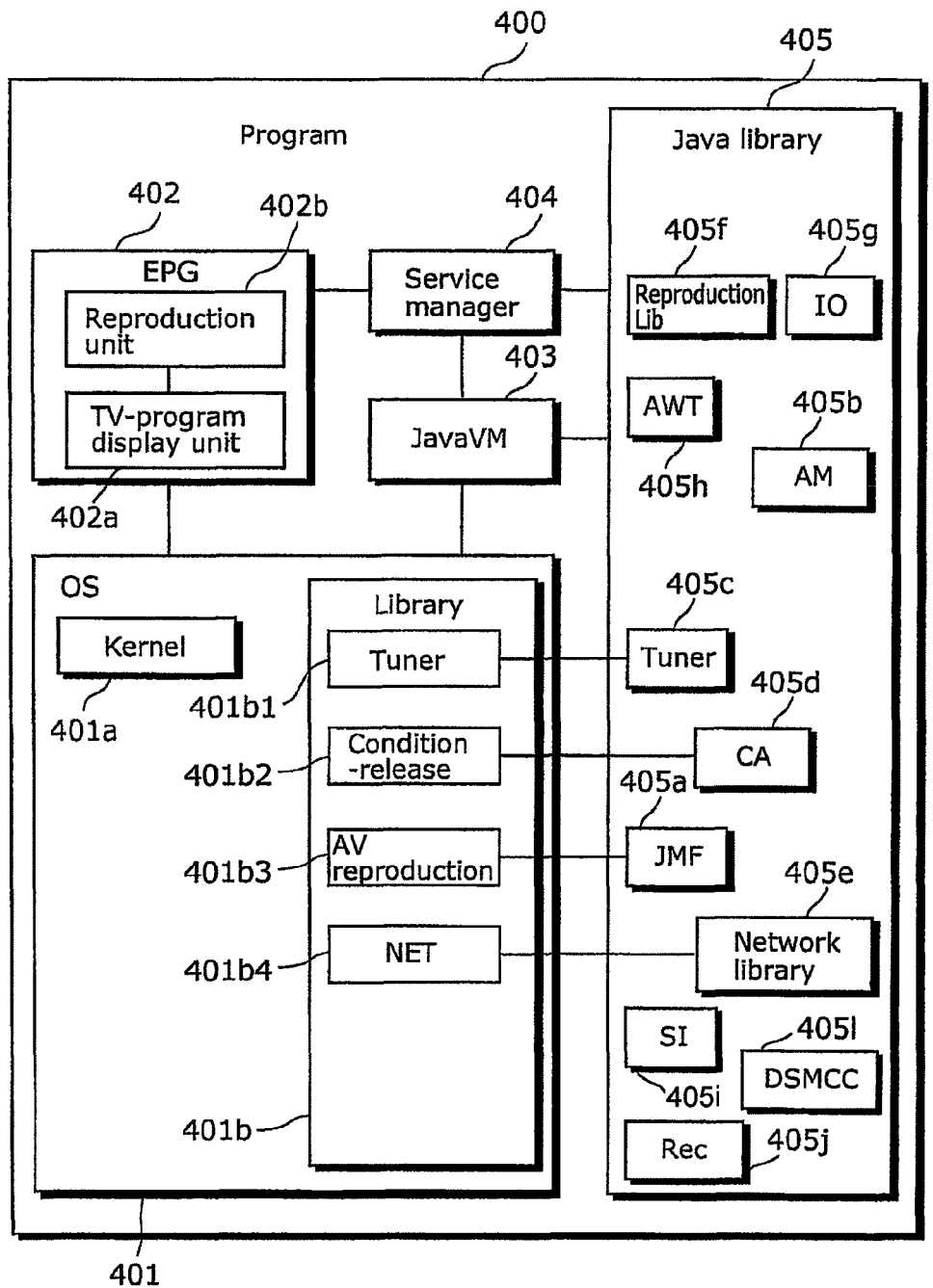
FIG. 4 is a structure diagram for the program structure stored in the multimedia data transmitting apparatus 101 in the embodiment of the present invention.

FIG. 4 is an example of a structure diagram of the program stored in the second memory 203 and executed by the CPU 212.

A program 400 is made up of plural subprograms, and is specifically made up of an OS 401 an EPG 402, a Java VM 403, a service manager 404, and a Java library 405.

The OS 401 is a subprogram activated on the CPU 212 when power to the multimedia data transmitting apparatus 101 is turned on. OS is the acronym for the operating system, an example of which is Linux and the like. The OS 401 is a generic name for publicly known technology made up of a kernel 401a for executing a subprogram concurrently with another subprogram and of a library 401b, and therefore detailed description is omitted. In the present embodiment, the kernel 401a of the OS 401 executes the EPG 402 and the VM 403 as subprograms. Furthermore, the library 401b provides these subprograms with plural functions required for controlling the constituent elements held by the multimedia data transmitting apparatus 101.

In the present embodiment, the library 401b includes a tuner 401b1, condition-release 401b2, AV reproduction 401b3, and NET 401b4, as an example of functions.

The tuner 401b1 receives tuning information including a frequency from other subprograms or a Tuner 405c of the Java library 405, and passes the received tuning information to the receiving unit 204. The receiving unit 204 can perform demodulation based on the provided tuning information, and pass the demodulated data to the demultiplex unit 205. As a result, the other subprograms and the Tuner 405c of the Java library 405 can control the receiving unit 204 through the library 401b.

The condition-release 401b2 receives information from other subprograms or a CA 405d of the Java library 405, and passes the received information to the descrambler 206.

The AV reproduction 401b3 receives the audio packet ID and video packet ID from the other subprograms or a JMF 405a of the Java library 405. The AV reproduction 401b3 then provides the received audio packet ID and video packet ID to the TS decoder 207. As a result, the TS decoder 207 performs filtering based on the provided packet IDs, and implements the reproduction of audio/video.

The NET 401b4 creates packets of a protocol lower than the application layer defined by the IP network, for the data received from the other subprograms or a network library 405e of the Java library 405. A protocol lower than the application layer refers to, for example, a TCP packet, a UDP packet, an IP packet, and so on. By passing this to the network unit 211, messages and data are transmitted to another device via the network 103. Furthermore, when a message is received from another device via the network 103, the NET 401b4 converts the message to an application layer protocol packet and passes this packet to the other subprograms or the network library 405e of the Java library 405. An application layer protocol refers to, for example, HTTP, Real-time Transport Protocol (RTP), and so on.

Figure 5A:
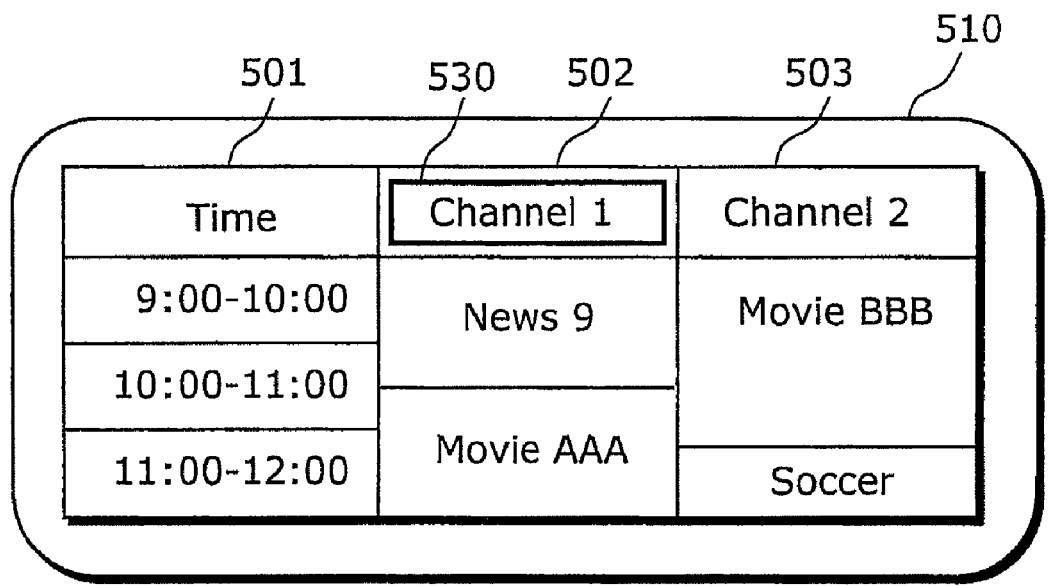
FIG. 5A is a diagram showing an example of a screen display in the present invention.
Figure 5B:
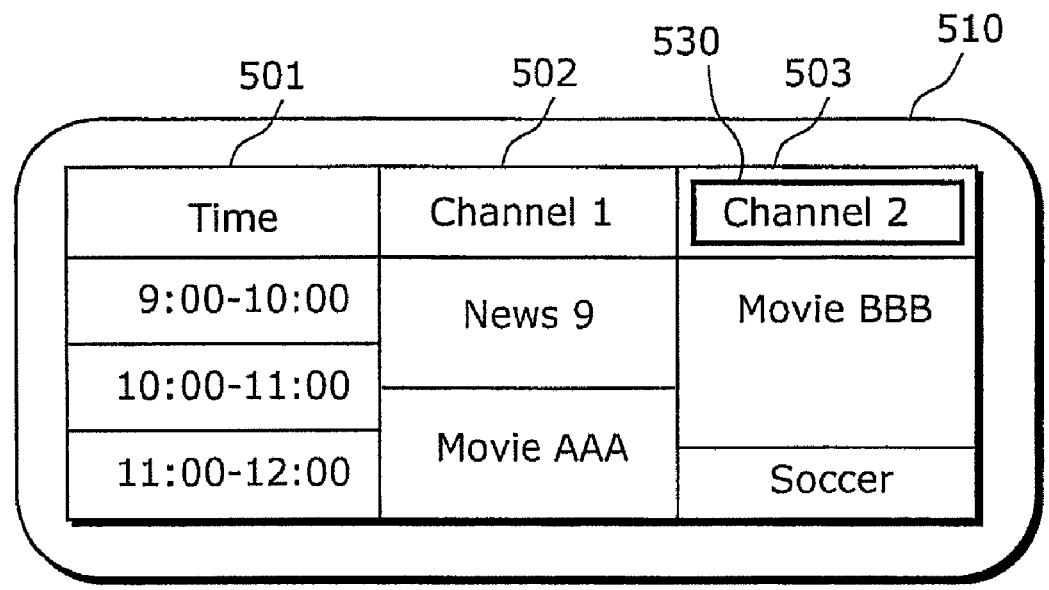
FIG. 5B is a diagram showing another example of a screen display in the present invention.

The EPG 402 is made up of a TV-program display unit 402a for displaying a list of TV-programs to the user as well as for accepting an input from the user, and a reproduction unit 402b for selecting channels. Here, EPG is an abbreviation of Electric Program Guide. The EPG 402 is activated by the kernel 401a when power to the multimedia data transmitting apparatus 101 is turned on. Inside the activated EPG 402, the TV-program display unit 402a and the reproduction unit 402b are activated at the same time. When activated, the TV-program display unit 402a waits for an input from the user through the input unit 201 of the multimedia data transmitting apparatus 101. Here, in the case where the input unit 201 is configured of a front panel as shown in FIG. 3, when the user presses down the EPG button 307 of the input unit 201, the identifier of such EPG button is notified to the CPU 212. The TV-program display unit 402a of the EPG 402, which is a subprogram running on the CPU 212, accepts this identifier, then creates TV-program information display data, and displays this on a monitor 510 using a monitor output unit that is not shown in the figure. The monitor 510 may be included in the multimedia data transmitting apparatus 101, and may also be a television connected to the multimedia data transmitting apparatus 101 by a composite cable, HDMI cable, or the like. The monitor 510 displays the received TV-program information display data. FIGS. 5A and 5B show examples of a TV-program list displayed on the monitor 510. Referring to FIG. 5A, TV-program information is displayed on the monitor 510 in a grid pattern. A column 501 displays time information. A column 502 displays a channel name "Channel 1" and TV-programs to be broadcast during time periods corresponding to the respective times described in the column 501. The monitor 510 shows that, on "Channel 1", a TV-program "News 9" is broadcast from 9:00 to 10:30, and "Movie AAA" is broadcast from 10:30 to 12:00. As in the case of the column 502, a column 503 displays a channel name "Channel 2" and TV shows to be broadcast during time periods corresponding to the respective times described in the column 501. A TV show "Movie BBB" is broadcast from 9:00 to 11:00, and "News 11" is broadcast from 11:00 to 12:00. 530 is a cursor. The cursor 530 moves at the press of the left-cursor 303 or the right-cursor 304 on the front panel 300. When the right-cursor 304 is pressed down in the state illustrated in FIG. 5A the cursor 530 moves towards the right as shown in FIG. 5B. Furthermore, when the left-cursor 303 is pressed down in the state illustrated in FIG. 5B the cursor 530 moves towards the left as shown in FIG. 5A.

When the OK button 305 on the front panel 300 is pressed down in the state shown in FIG. 5A, the TV-program display unit 402a notifies the reproduction unit 402b of the identifier of the "Channel 1". When the OK button 305 on the front panel 300 is pressed down in the state shown in FIG. 5B, the TV-program display unit 402a notifies the reproduction unit 402b of the identifier of the "Channel 2".

Furthermore, through the demultiplex unit 205, the TV-program display unit 402a regularly stores in advance, in the second memory 203, TV-program information to be displayed. Generally, it takes time to obtain TV-program information from the broadcast station. It is possible to quickly display a TV-program table by displaying the TV-program information previously stored in the second memory 203, at the press of the EPG button 307 of the input unit 201

FIG. 6 shows an example of TV-program information stored in the second memory 203. The TV-program information is stored in tabular form. A column 601 describes the identifiers of channels. A column 602 describes TV-program names. A column 603 describes the broadcast start times of the TV-programs, and a column 604 describes the broadcast end times. A column 605 describes the sound type of the TV-programs, and indicates mono sound, stereo sound, and 5.1 channel sound as "mono", "stereo", and "5.1", respectively. A column 606 describes the type of the TV-programs. A regular TV-program is described as an empty cell, a movie is described as "movie", and a sports program is described as "spo". Each of rows 611 to 614 describes information for one TV-program. In this example, one TV-program information is the set of the channel identifier, TV-program name, broadcast start time, broadcast end time, and TV-program sound type. For example, the row 611 describes a set which includes "1" as the channel identifier, "news 9" as the TV-program name, "9:00" as the broadcast start time, "10:30" as the broadcast end time, "mono" as the sound-type, and "regular" as the TV-program type.

Figure 7:
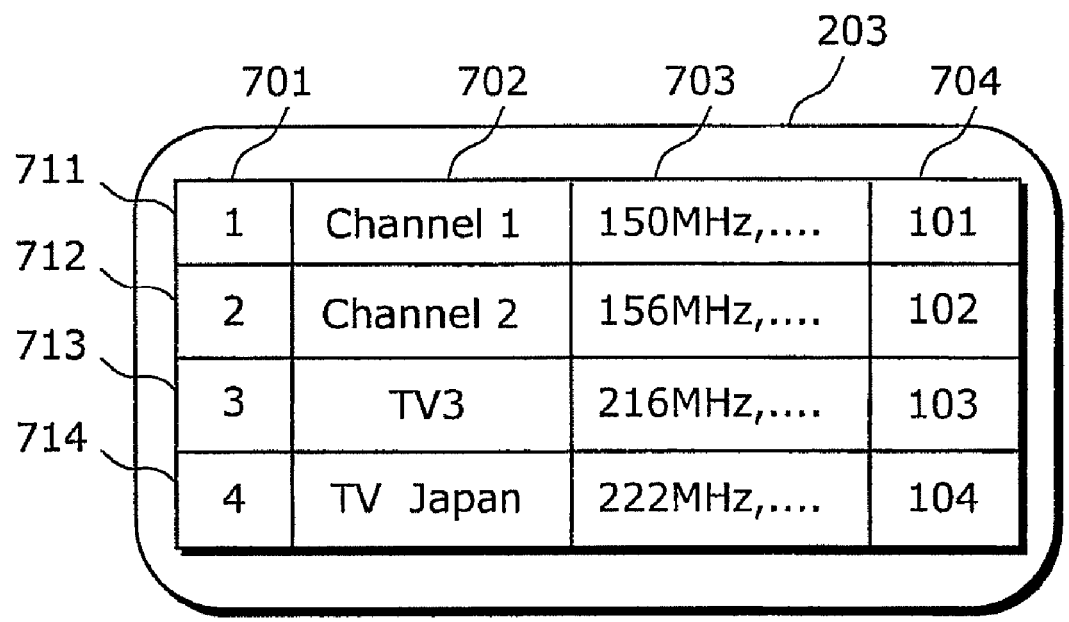
FIG. 7 is a diagram showing another example of information stored in the second memory 203 of the present invention.

The reproduction unit 402b reproduces a channel using the received identifier of the channel. In other words, it reproduces the video and audio making up the channel. The relationship between channel identifiers and channels is pre-stored in the second memory 203 as channel information. FIG. 7 shows an example of the channel information stored in the second memory 203. The channel information is stored in tabular form. A column 701 describes the identifiers of channels. A column 702 describes channel names. A column 703 describes tuning information. Here, the tuning information are values to be provided to the receiving unit 204, such as frequency, transmission rate, and coding ratio. A column 704 describes program numbers. Program numbers are numbers used to identify PMTs defined by the MPEG-2 standard. A description about PMT is given later. Each of rows 711 to 714 indicates a set of the identifier, channel name, and tuning information of each channel. The row 711 describes a set that includes "1" as an identifier, "Channel 1" as a channel name, a frequency of "150 MHz" as tuning information, and "101" as a program number. The reproduction unit 402b passes the identifier of the received channel directly to the service manager 404 in order to reproduce the channel.

Figure 8A:
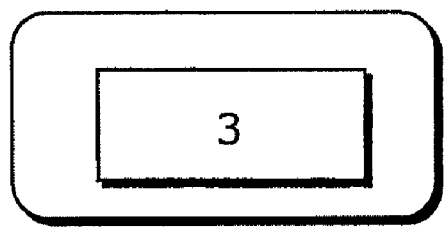
FIG. 8A is a diagram showing an example of information stored in the second memory 203 of the present invention.
Figure 8B:
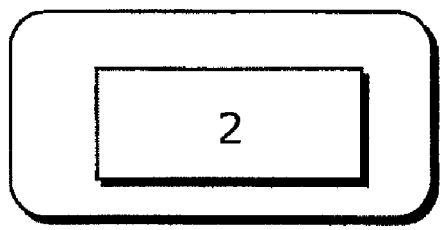
FIG. 8B is a diagram showing another example of information stored in the second memory 203 of the present invention.
Figure 8C:
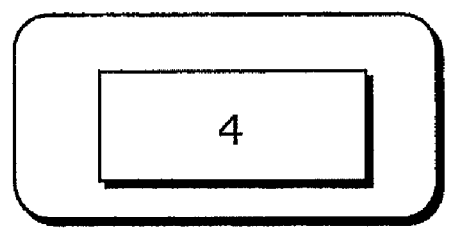
FIG. 8C is a diagram showing another example of information stored in the second memory 203 of the present invention.

Moreover, when the user presses down the up-cursor 301 or the down-cursor 302 on the front panel 300 while the reproduction is taking place, the reproduction unit 402b receives a notification about such pressing from the input unit 201 through the CPU 212, and changes the channel being reproduced accordingly. When the up-cursor 301 is pressed down, a channel having the next lower channel identifier to that of the currently-reproduced channel is reproduced, and when the down-cursor 302 is pressed down, a channel having the next higher channel identifier to that of the currently-reproduced channel is reproduced. First, the reproduction unit 402b stores, in the second memory 203, the identifier of the channel that is currently reproduced. FIGS. 8A, 8B, and 8C show example identifiers of channels stored in the second memory 203. FIG. 8A shows that an identifier "3" is stored, and by referring to FIG. 7, it is shown that a channel having the channel name "TV 3" is currently being reproduced. When the user presses down the up-cursor 301 in a state illustrated in FIG. 8A, the reproduction unit 402b refers to the channel information shown in FIG. 7, and passes the identifier "2" of a channel with the channel name of "Channel 2" to the service manager 404 in order to switch reproduction to the channel with the channel name of "Channel 2" which is the channel having an identifier that is one value lower than that of the channel currently being reproduced. At the same time, the reproduction unit 402b rewrites the identifier stored in the second memory 203 to the channel identifier "2". FIG. 8B shows the state in which the channel identifier has been rewritten. Furthermore, when the user presses down the down-cursor 302 in a state illustrated in FIG. 8A, the reproduction unit 402b refers to the channel information shown in FIG. 7, and passes the identifier "4" of a channel having the channel name of "TV Japan" to the service manager 404 in order to switch reproduction to the channel having the channel name of "TV Japan" which is the channel having an identifier which is one value higher than that of channel currently being reproduced. At the same time, the reproduction unit 402b rewrites the identifier stored in the second memory 203 to the channel identifier "4". FIG. 8C shows the state in which the channel identifier has been rewritten. The channel identifier is saved, even when power to the multimedia data transmitting apparatus 101 is cut-off, since it is stored in the second memory 203.

In addition, upon being activated when power to the multimedia data transmitting apparatus 101 is turned on, the reproduction unit 402b reads the channel identifier stored in the second memory 203. Then, the reproduction unit 402b passes such channel identifier to the service manager. With this, when power is turned on, the multimedia data transmitting apparatus 101 is able to start the reproduction of the last channel that was being reproduced at the time of its previous operation.

The Java VM 403 is a Java virtual machine that sequentially analyzes and executes programs written in the Java™ language. Programs written in the Java language are compiled into intermediate codes known as byte codes which are not dependent on hardware. A Java virtual machine is an interpreter that executes such byte code. Some Java virtual machines pass the byte code to the CPU 212 after translating the byte code into an execution format which can be interpreted by the CPU 212, and executes it. The Java VM 403 is activated, with a Java program to be executed being specified by the kernel 401a. In the present embodiment, the kernel 401a specifies the service manager 404 as the Java program to be executed. Details of the Java language are described in many publications such as "Java Language Specification (ISBN 0-201-63451-1)". Here, such details are omitted. Furthermore, the detailed operation of the Java VM itself is described in many publications such as "Java Virtual Machine Specification (ISBN 0-201-63451-X)". Here, such details are omitted.

The service manager 404, which is a Java program written in the Java language, is sequentially executed by the Java VM 403. It is possible for the service manager 404 to call or be called by another subprogram not written in the Java language, through the Java Native Interface (JNI). The JNI is also described in many publications such as in the book "Java Native Interface" and so on. Here, such details are omitted.

First the process in the case of receiving a digital broadcast and reproducing the received multimedia data shall be described.

The service manager 404 accepts the identifier of a channel from the reproduction unit 402b, through the JNI.

The service manager 404 first passes the identifier of the channel to the Tuner 405c in the Java library 405, and requests for tuning. The Tuner 405c refers to the channel information stored in the second memory 203, and obtains the tuning information. Now, when the service manager 404 passes the identifier "2" of the channel to the Tuner 405c, the Tuner 405c refers to the column 712 shown in FIG. 7, and obtains the corresponding tuning information "156 MHz". The Tuner 405c passes the tuning information to the receiving unit 204 through tuner 401b1 of the library 401b of the OS 401. The receiving unit 204 performs demodulation on the signal transmitted from the broadcast station, based on the provided tuning information, and passes the result to the demultiplex unit 205.

The service manager 404 requests the CA 405d inside the Java library 405 to perform descrambling. The CA 405d provides the descrambler 206 with information required for descrambling, through the condition-release 401b2 of the library 401b in the OS 401. On the basis of such provided information, the descrambler 206 descrambles the signal provided by the receiving unit 204, and passes the result to the TS decoder 207.

The service manager 404 provides the identifier of the channel to a JMF 405a inside the Java library 405, and requests for the reproduction of the video and audio.

Figure 9:
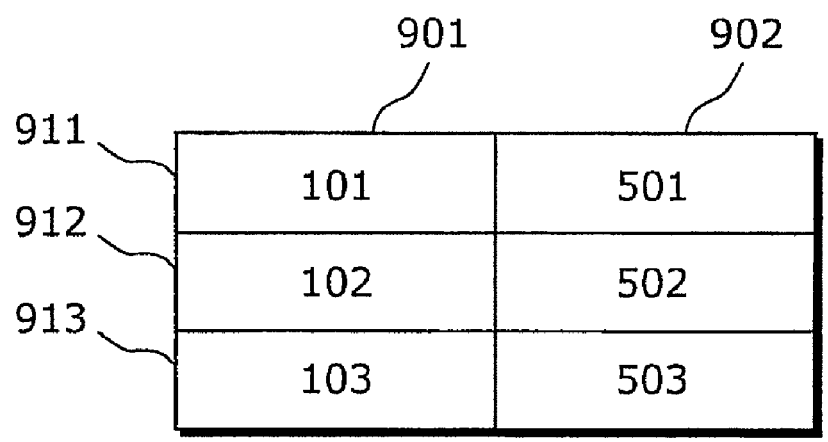
FIG. 9 is a diagram showing another example of information stored in the second memory 203 of the present invention.
Figure 10:
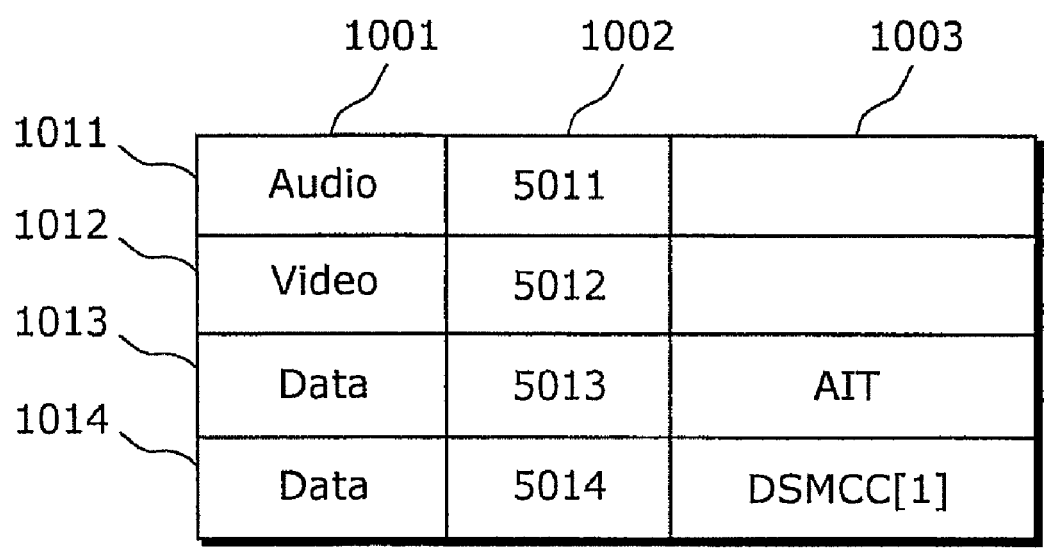
FIG. 10 is a diagram showing another example of information stored in the second memory 203 of the present invention.

First, the JMF 405a obtains, from a PAT and a PMT, packet IDs used to specify the video and audio to be reproduced. PAT and PMT are tables stipulated by the MPEG-2 standard that show the TV-program line-up included in an MPEG-2 transport stream. PAT and PMT are embedded in the payloads in packets included in an MPEG-2 transport stream, and sent together with audio and video. Refer to the Specification for details. Here, only the outline shall be described. PAT, which is an abbreviation of Program Association Table, is stored and sent in packets with the packet ID "0". In order to obtain the PAT, the JMF 405a specifies, to the demultiplex unit 205, the packet ID"0", through the library 401b of the OS 401. The demultiplex unit 205 performs filtering based on the packet ID "0" and, by passing the result to the CPU 212, the JMF 405a collects the PAT packets. FIG. 9 is a chart which schematically shows an example of information of the collected PAT. A column 901 describes program numbers. A column 902 describes packet IDs. The packet IDs shown in the column 902 are used to obtain the PMT. Each of rows 911 to 913 is a pair of the program number of a channel and a corresponding packet ID. Here, three channels are defined. The row 911 defines a pair of the program number "101"and the packet ID "501". Now, when the channel identifier provided to the JMF 405a is "2", the JMF 405a refers to the column 912 in FIG. 9, so as to obtain the corresponding program number "102", and then refers to the column 912 in the PAT shown in FIG. 9, so as to obtain the packet ID "502" corresponding to the program number "102". PMT, which is an abbreviation of Program Map Table, is stored and sent in packets of the packet ID stipulated in the PAT. In order to obtain the PMT, the JMF 405a specifies the packet ID to the demultiplex unit 205, through the library 401b of the OS 401. Here, it is assumed that the packet ID specified is "502". The demultiplex unit 205 performs filtering based on the packet ID "502" and, by passing the result to the CPU 212, the JMF 405a collects the PMT packets. FIG. 10 is a chart which schematically shows an example of information of the collected PMT. A column 1001 describes stream types. A column 1002 describes packet IDs. Information specified in the respective stream types is stored and sent in the payloads of packets with the packet IDs specified in the column 1002. A column 1003 describes supplementary information. Each of columns 1011 to 1014 is a pair of a packet ID and the type of information being transmitted, which is known as an elementary stream. The column 1011, which is a pair of the stream type "audio" and the packet ID "5011", indicates that audio data is stored in the payload of the packet with the packet ID "5011". The JMF 405*a* obtains, from the PMT, the packet IDs of the video and audio to be reproduced. Referring to FIG. 10, the JMF 405*a* obtains the audio packet ID "5011" from the row 1011, and the video packet ID "5012" from the row 1012.

Next, the JMF 405*a* passes the obtained audio packet ID and video packet ID to the AV reproduction 401*b*3 of the library 401*b* of the OS 401. Upon receiving this, the AV reproduction 401*b*3 provides the received audio packet ID and video packet ID to the TS decoder 207. The TS decoder 207 performs filtering based on such provided packet IDs. Here, the packet with the packet ID "5011" is passed to the audio output unit 209, and the packet with the packet ID "5012" is passed to the video output unit 208. The audio output unit 209 converts (for example, digital-analog conversion) the provided packet, as necessary, and outputs this. The video output unit 208 converts (for example, digital-analog conversion) the provided packet, as necessary, and outputs this.

Finally, the service manager 404 provides the channel identifier to an AM 405*b* inside the Java library 405, and requests for data broadcast reproduction. Here, data broadcast reproduction refers to extracting a Java program included in the MPEG-2 transport stream, and having it executed by the Java VM 403. As a method of encapsulating a Java program in an MPEG-2 transport stream, a method referred to as DSMCC, which is described in the MPEG Standard ISO/IEC 13818-6, is used. Here, detailed description of DSMCC shall be omitted. The DSMCC defines a method of encoding the file system made up of directories and files used by a computer in the packets of an MPEG-2 transport stream. Here, the DSMCC 4051 in the Java library 405 obtains the data encoded according to the Object Carousel method. Furthermore, information about the Java program to be executed is embedded and sent in packets in the MPEG-2 transport stream in a format referred to as AIT. AIT is an abbreviation of Application Information Table defined in the 10th chapter of the DVB-MHP Standard (formally as, ETS TS 101 812 DVB-MHP Specification V1.0.2).

First, in order to obtain the AIT, the AM 405*b* obtains the PAT and PMT as in the case of the JMF 405*a*, so as to obtain the packet ID of the packet that stores the AIT. Now, when "2" is the identifier of the provided channel and the PAT shown in FIG. 9 and the PMT shown in FIG. 10 are being transmitted, the Rec 405*j* obtains the PMT shown in FIG. 10 according to the same procedure followed by the JMF 405*a*. The AM 405*b* extracts, from the PMT, the packet ID of the elementary stream having a stream type of "Data" and which has "AIT" as supplementary information. Referring to FIG. 10, the elementary stream in the row 1013 corresponds to such description, and therefore the AM 405*b* obtains the packet ID "5013".

Figure 11:
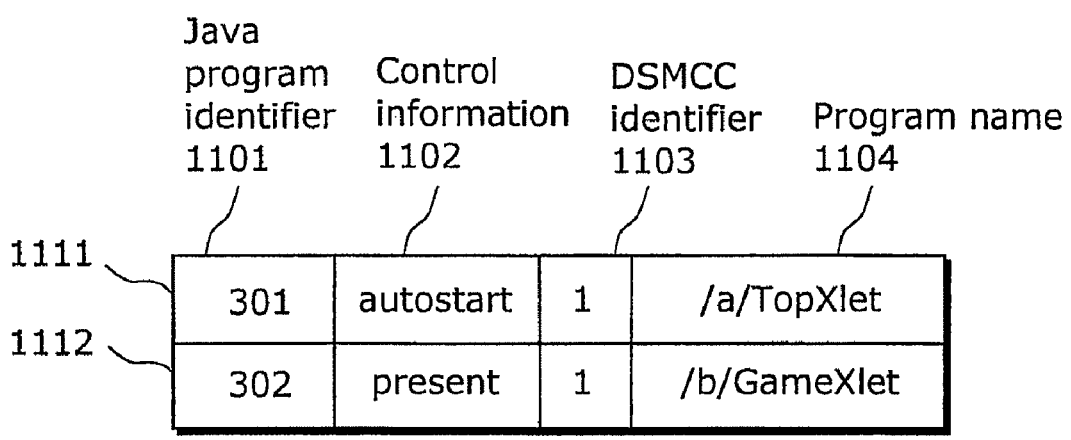
FIG. 11 is a diagram showing another example of information stored in the second memory 203 of the present invention.

The AM 405*b* provides the packet ID of the AIT to the demultiplex unit 205, through the library 401*b* of the OS 401. The demultiplex unit 205 performs filtering based on such provided packet ID, and passes the result to the CPU 212. As a result, the AM 405*b* can collect the packets of AIT. FIG. 11 is a chart which schematically shows an example of information of the collected AIT. A column 1101 describes the identifiers of Java programs. A column 1102 describes control information of the Java programs. The control information includes "autostart", "present", and "kill". "autostart" means that the multimedia data transmitting apparatus 101 automatically executes the program immediately. "present" means that the program is not executed automatically. "kill" means that the program is to be terminated. A column 1103 describes DSMCC identifiers for extracting packet IDs including a Java program in the DSMCC format. A column 1104 describes program names of the Java programs. Each of rows 1111 and 1112 is a set of information about a Java program. The Java program defined in the row 1111 is a set of an identifier "301", control information "autostart", a DSMCC identifier "1", and a program name "a/TopXlet". The Java program defined in the row 1112 is a set of an identifier "302", control information "present", a DSMCC identifier "1", and a program name "b/GameXlet". Here, the two Java programs have the same DSMCC identifier which indicates that two Java programs are included within a single file system encoded in the DSMCC format. Here, only four items of information are stipulated for the respective Java programs, but more items of information are specified in actuality. Refer to the DVB-MHP standard for details.

The AM 405*b* finds the "autostart" Java program from within the AIT, and extracts the corresponding DSMCC identifier and Java program name. Referring to FIG. 11, the AM 405*b* extracts the Java program in the row 1111, and obtains the DSMCC identifier "1" and the Java program name "a/TopXlet".

Next, using the DSMCC identifier obtained from the AIT, the AM 405*b* obtains, from the PMT, the packet ID of packets that store Java programs in the DSMCC format. More specifically, the AM 405*b* obtains, from within the PMT, the packet ID of the elementary stream whose stream type is "Data" and having a matching DSMCC identifier in the supplementary information.

Now, assuming that such DSMCC identifier is "1" and the PMT is that shown in FIG. 10, the elementary stream in the row 1014 matches, and the packet ID "5014" is to be extracted.

The AM 405*b* specifies the packet ID of the packet in which data is embedded in the DSMC format, to the demultiplex unit 205, through the library 401*b* of the OS 401. Here, the packet ID "5014" is provided. The demultiplex unit 205 performs filtering based on such provided packet ID, and passes the result to the CPU 212. As a result, the AM 405*b* can collect the required packets. The AM 405*b* reconstructs the file system from the collected packets, according to the DSMCC format, and stores this in the first memory 202 or the second memory 203. Extracting the data of a file system, and the like, and storing this in the first memory 202 or the second memory 203 shall hereafter be referred to as download.

Figure 12:
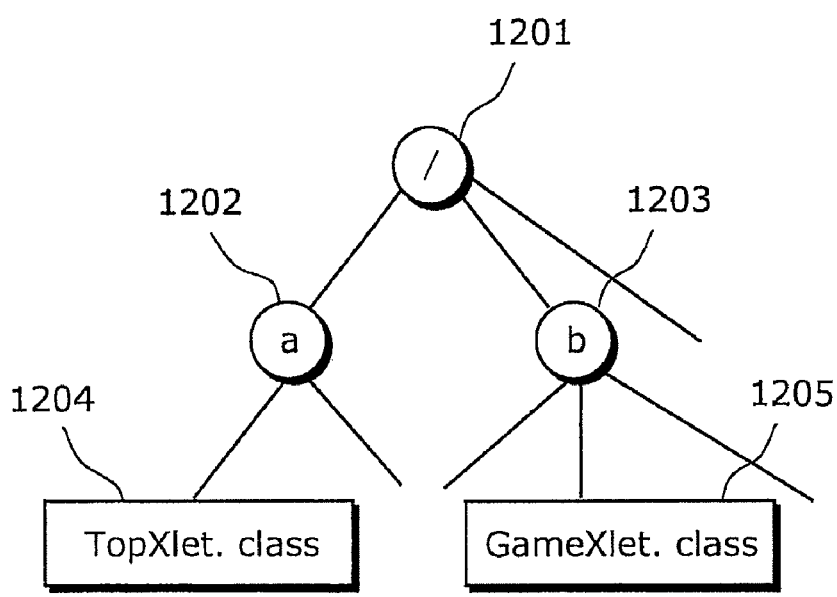
FIG. 12 is a diagram showing another example of information stored in the second memory 203 of the present invention.

FIG. 12 shows an example of a downloaded file system. In the figure, a circle denotes a directory and a square denotes a file. 1201 denotes a root directory, 1202 denotes a directory "a", 1203 denotes a directory "b", 1204 denotes a file "TopXlet.class", and 1205 denotes a file "GameXlet.class".

Here, although an example of downloading a file system from an MPEG2 transport stream is described, the OCAP specification also stipulates downloading using an IP network, and so on. Furthermore, a method for identifying the location of a file system using information referred to as XAIT, instead of AIT, and downloading the file system is also stipulated.

Next, the AM 405*b* passes, to the Java VM 403, the Java program to be executed from within the file system downloaded into the first memory 202 or the second memory 203. Here, when the name of the Java program to be executed is "a/TopXlet", the file "a/TopXlet.class", having ".class" added to the end of the Java program name, is the file to be executed. "/" is a division of a directory and file name and, by referring to FIG. 12, the file 1204 is the Java program to be executed. Next, the AM 405*b* passes the file 1204 to the Java VM 403.

The Java VM 403 executes the Java program passed to it.

Upon receiving an identifier of an other channel, the service manager 404 stops the execution, through the respective libraries included in the Java library 405, of the video/audio and Java program currently being reproduced likewise through the respective libraries included in the Java library 405, and performs the reproduction of video/audio and execution of a Java program based on the newly received channel identifier.

Furthermore, the service manager 404 also includes a function for receiving the identifier of a channel from a Java program executed on the Java VM 403, aside from the reproduction unit 402*b*. Specifically, a Java language class for obtaining the identifier of the channel, and the method thereof, are provided. Upon receiving an identifier of a channel, the service manager 404 stops the execution, though the respective libraries included in the Java library 405, of the video/audio and Java program currently being reproduced likewise through the respective libraries included in the Java library 405, and subsequently performs the reproduction of new video/audio and the execution of a Java program based on the newly received channel identifier.

Next, the operation of receiving a digital broadcast and storing the multimedia data thereof, in the multimedia data transmitting apparatus 101 shall be described.

Figure 13:
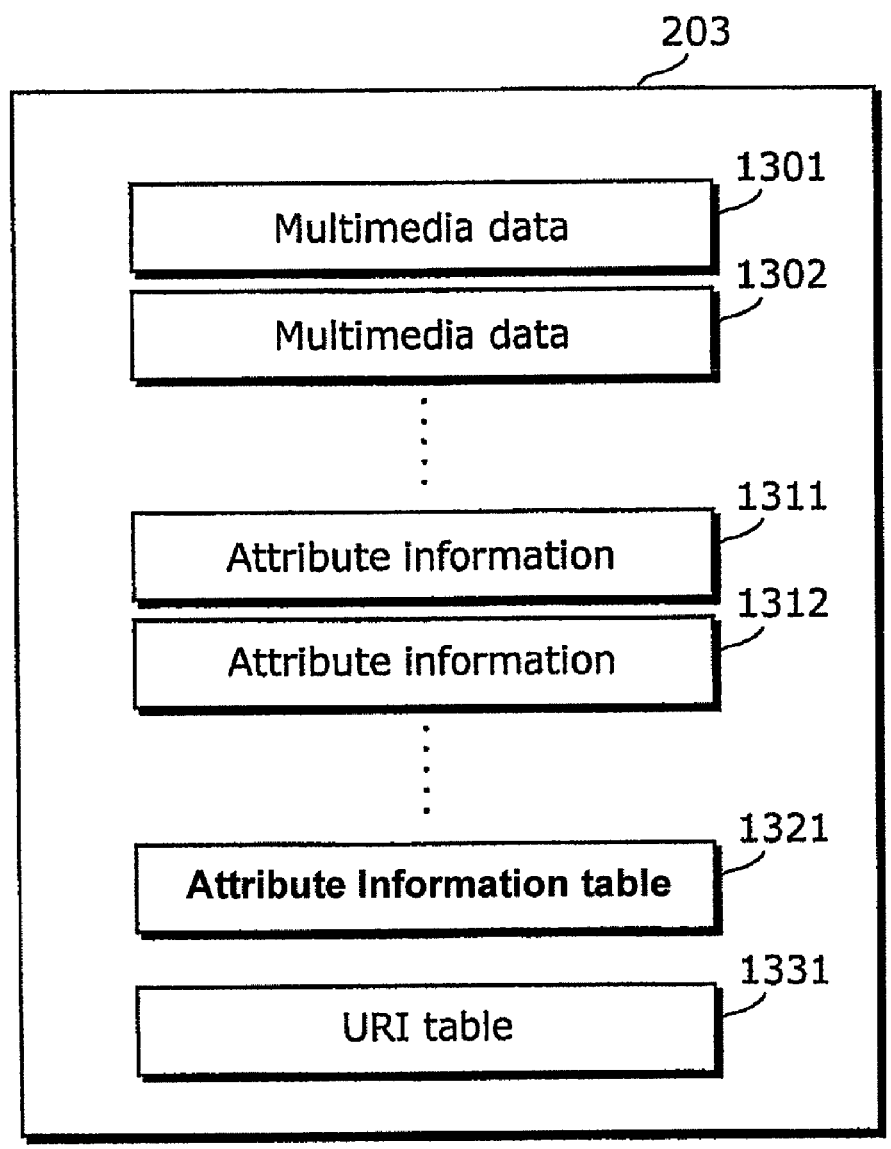
FIG. 13 is a diagram showing an example of the structure of data stored in the second memory 203 in the embodiment of the present invention.

FIG. 13 is an example of the form of the storing of multimedia data into the second memory 203 by the multimedia data transmitting apparatus 101. The multimedia data transmitting apparatus 101 stores, in the second memory 203, multimedia data and its attribute information, an attribute information table, and a URI table. In FIG. 13, 1301, 1302, . . . denote multimedia data, 1311, 1312, . . . denote attribute information of the multimedia data, 1321 denotes an attribute information table, and 1331 denotes a URI table. The multimedia data 1301, 1302, . . . are multimedia data encoded in the MPEG-2 TS format, and encrypted. The attribute information 1311, 1312, . . . are additional information such as the title of each multimedia data. Here, the attribute information 1311 describes attribute information of the multimedia data 1301, the attribute information 1312 describes attribute information of the multimedia data 1302.

FIG. 14 shows an example of attribute information in the present embodiment. In the present embodiment, attribute information is text defined in the Extensible Markup Language (XML). In FIG. 14, a ContentID element describes the identifier of a content; a FileName element describes the filename of the multimedia data; a FileTree element describe the directory name under which the file system configured of directories and files transmitted by an ObjectCarousel included in the multimedia data is stored; a ChannelID element describes an identifier of a channel on which the TV-program was broadcast, as shown in column 601 in FIG. 6; a ProgramNo element describes a program number for searching the PMT, as shown in column 704 in FIG. 7; a Title element describes the TV-program name as shown in column 602 in FIG. 6; a Genre element describes the type of the program, as shown in column 606 in FIG. 6; a Date element describes the date and time at which the TV-program was broadcast; a RecordDate element describes the date and time at which the TV-program was recorded; a PlaybackTime element describes the number of times the multimedia data has been reproduced or outputted to the network 103; a FormatType element describes the type of the media format of the content; and a ContentType element describes the ContentType assigned to the media format of the content by the Internet Assigned Numbers Authority (IANA). Note that the attribute information is not limited to the XML configuration, and recording in other formats such as binary data is also possible.

Figure 15:
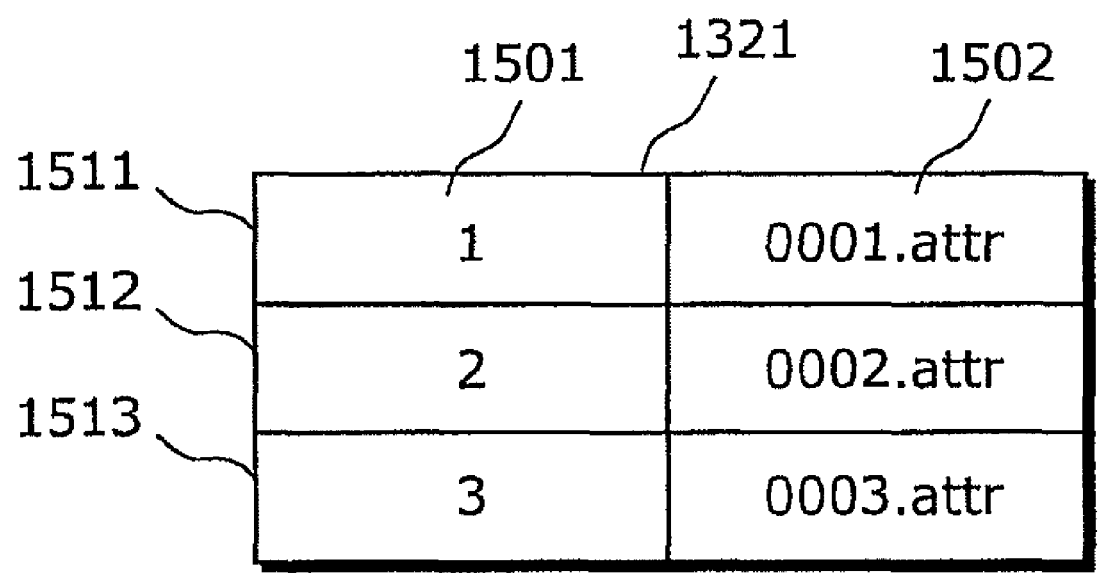
FIG. 15 is a diagram showing an example of the attribute information table in the embodiment of the present invention.

The attribute information table is a correspondence chart for the identifier of the content, the file on which the multimedia data of the content indicated by the identifier is recorded, and the file on which the attribute information is recorded. FIG. 15 shows an example thereof. In FIG. 15, a column 1501 describes the content identifiers, and a column 1502 describes file names of the attribute information. Rows 1511 to 1513 are pairs of the content identifier and the file name of the corresponding attribute information. From column 1511, it can be read that the attribute information of the content for identifier 1 is recorded in the file 0001.attr.

FIG. 16 shows an example of the structure of the URI table 1331. In FIG. 16, a column 1601 describes the identifiers of respective contents, and a column 1602 describes URIs for accessing the respective contents. A column 1603 describes URIs for accessing data holding update-point information of section data of AIT, PMT and the like. Rows 1611 to 1613 show sets of the identifier and URIs of respective contents. For example, row 1611 indicates that the URI of the content for identifier 1 is http://192.168.0.3/AVData/0001.m2ts., and the URI of the file holding the update-point information of an AIT section is http://192.168.0.3/VUP/0001-ait.vup.

Hereinafter, the storing process shall be described. First, the operation up to descrambling is the same as in the case of the previously described reproduction. Next, the service manager 404 requests, the CA 405*d*, for the obtainment of protection necessary/unnecessary information concerning the multimedia data and, in the case where protection is necessary, information on the kind of protection. This information shall be called protection information. The CA 405*d* receives the protection information of the multimedia data from the descrambler 206, and passes the received protection information to the service manager 404. Next, the service manager 404 judges, from the protection information passed on to it, whether or not the multimedia data can be stored. Only in cases where storing is possible does the service manager 404 request the storing of the multimedia data, and the recording of the update-point within the multimedia data, to the Rec 405*j* inside the Java library 405.

Figure 17:
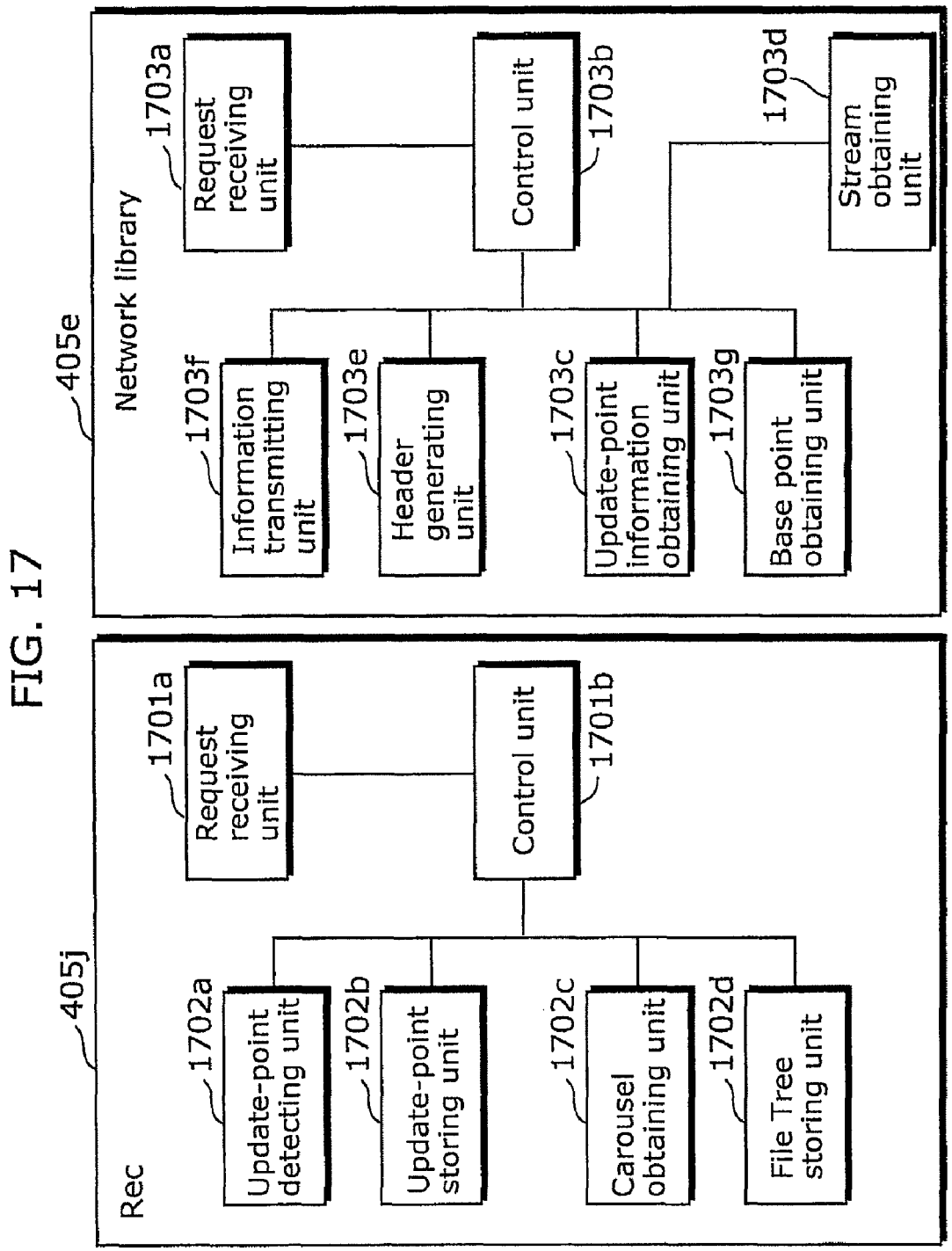
FIG. 17 is an internal configuration diagram for the Rec 405*j* and the network library 405*e*.

Here, FIG. 17 is a block diagram showing an example of the internal configuration of the Rec 405*j* shown in the configuration diagram of the program in FIG. 4.

A request receiving unit 1701*a* receives the request for storing the multimedia data received from the service manager 404 and the recording of the update-point in the multimedia data, and forwards the request details to a control unit 1701*b*.

In order to obtain the service and packet ID of the multimedia requested, the control unit 1701*b*, in the same manner as the above-described JMF 405*a* and AM 405*b*, obtains the PAT and PMT and obtains the packet IDs of video data, audio data, and respective section data, concerning the TV-program to be stored. Now, when "2" is the identifier of the provided channel and the PAT shown in FIG. 9 and the PMT shown in FIG. 10 are being transmitted, the Rec 405*j* obtains the PMT shown in FIG. 10 according to the same procedure followed by the JMF 405*a*. Note that, here, the data to be stored are all the data described in the PMT in FIG. 10.

The control unit 1701*b* provides these packet IDs to the TS decoder 207 through the library 401*b* of the OS 401 and causes these to be outputted to the TS multiplexer 210. The TS decoder 207 performs filtering based on such provided packet IDs, and passes the result to the TS multiplexer 210. At this time, the control unit 1701*b* notifies, to an update-point detecting unit 1702*a*, a packet ID identifying the section of which update is to be obtained.

The update-point detection unit 1702*a* compares the received section and the received section obtained previously, with regard to the identified section, and judges whether a version up for the section has occurred. At this juncture, the update-point detection unit 1702*a* checks the version field of the section and, when the version has changed, passes this section to the update-point storing unit 1702*b* in order to store the section details transmitted by this section.

With respect to the update-point detected by the update-point detecting unit 1702*a*, the update-point storing unit 1702*b* writes the timing of the version up occurrence and the section data at that point, into the second memory 203, by requesting the IO 405*g*. Hereinafter, this information shall be called update-point information; an example of which is shown in FIG. 18. In FIG. 18, a column 1801 denotes types of the section. This is, for example, ait, pmt, and so on. A column 1802 denotes version numbers. A column 1803 denotes the time information at which the version changed. The time information is represented with the elapsed time from the beginning of the multimedia content. A column 1804 denotes a start position in a stream, for the transmission of the section whose version has changed, and a column 1805 denotes an end position in the stream, for the transmission of the section whose version has changed. Note that columns 1804 and 1805 are specified using byte positions when the beginning of the multimedia content is assumed to be 0. A column 1806 denotes binary section lengths by the number of bytes; a column 1807 denotes binary data of the section. Note that the update-point information shown in FIG. 18 is not limited to this format, and other formats are acceptable as long as information indicating the update-point and information indicating the details of the update are included.

After the update-point storing unit 1702*b* has written the update-point information, the control unit 1701*b* generates a URI indicating the place of storage of FIG. 18 in the second memory 203. Note that although a figure of version up of ait is shown in FIG. 18, the version up of pmt or a format in which different sections such as ait and pmt are written in the same table is also acceptable. Furthermore, although a method which collectively records the update-point information of a stream, at the time when multimedia content is recorded, is shown here, it is also possible that the update-point information is created from a stored MPEG transport stream at the timing when the request for stream update-point information from the multimedia data receiving apparatus 102 is received.

Furthermore, at the time of referring to the StreamType of Elementary Stream (hereafter called ES) included in the received PMT, the control unit 1701*b* checks whether an ObjectCarousel with StreamType=0x0b is included. Then, in the case where ObjectCarousel is included in the multimedia data, the control unit 1701*b* requests carousel obtainment to the carousel obtaining unit 1702*c*.

Using the DSMCC 4051 of the Java library 405, the carousel obtaining unit 1702*c* downloads all ObjectCarousels transmitted with the multimedia data, and constructs, for each Carousel, a file structure such as that shown in FIG. 12. This file structure shall hereafter be called FileTree. In order to store the obtained FileTree, a FileTree storing unit 1702*d* is called.

The FileTree storing unit 1702*d* stores the FileTree in the second memory 203 by requesting the IO 405*g*. At this time, the FileTree storing unit 1702*d* records the directory where the FileTree is stored in the FileTree element in FIG. 14.

Note that although a method which records the ObjectCarousels at the time when the multimedia content is recorded, it is also possible that the FileTree is newly created from an MPEG transport stream stored in the second memory 203, at the timing when the file obtainment request from the multimedia data receiving apparatus 102 is received.

Note that although the update-point detecting unit 1702*a*, which detects the version up of a section, is implemented as a constituent element of the Rec 405*j* here, this function may be included in the SI 405*i*, or may also be a function of the TS decoder 207.

The control unit 1701*b* causes the TS multiplexer 210 to generate an MPEG-2 transport stream by providing data filtered by the TS decoder 207 and the type of such data, to the TS multiplexer 210.

In addition, by requesting the IO 405*g* in the Java library 405, the control unit 1701*b* writes the MPEG transport stream generated by the TS multiplexer 210, in the second memory 203.

In addition, the control unit 1701*b* obtains the channel identifier of the TV-program by requesting the service manager 404, and reads the TV-program information corresponding to the stored multimedia data from among the TV-program information stored in the second memory 203 shown in FIG. 6, by requesting the IO 405*g*.

In addition, the control unit 1701*b* obtains the identifier of the stored multimedia data, by requesting the service manager 404.

Furthermore, the control unit 1701*b* creates attribute information from the obtained TV-program information, the identifier of the multimedia data, the file name where the multimedia data is stored, and the aforementioned URI of the update-point information, and writes the attribute information into the second memory 203 by requesting the IO 405*g*.

In addition, the control unit 1701*b* reads the attribute information table by requesting the IO 405*g* and, updates its content, and rewrites the updated table into the second memory 203 by requesting the IO 405*g*, to update the attribute information table.

Next, the process of transmitting the multimedia data requested by a terminal connected to the network 103 among the multimedia data stored in the second memory 203 to the request-source terminal shall be described.

Here, the right portion of FIG. 17 shows a block diagram showing an example of the internal configuration of the network library 405*e* shown in the configuration diagram of the program illustrated in FIG. 4.

Hereinafter, the explanation shall be described using the example in which the URI table 1331 is as shown in FIG. 16 and the following request is received.

GET http://192.168.0.3/AVData/0001.m2ts HTTP/1.1
Host: 192.168.0.3
Date: Thr Jan 11 15:00:00 2007 GMT
User-Agent: AVT Client
Connection: Keep-Alive
X-Version-Request: type=ait; scope=all
X-Tree-Base-Request: carousel_id=1

A request receiving unit 1703*a* analyzes a request message transmitted from the request-source terminal, and passes the details thereof to a control unit 1703*b*. In the case where the above-described request is received, the request receiving unit 1703*a* obtains, at least, the URI of the requested content and the details of X-Version-Request and the X-Tree-Base-Request, and passes them to the control unit 1703*b*.

Following the information received from the request receiving unit 1703*a*, the control unit 1703*b* controls the other constituent elements of the network library 405*e*, generates a response message, and transmits the generated response message to the request-source terminal. First, when the received request message is invalid, the control unit 1703b: causes the generation of an HTTP error message of the corresponding to the error by requesting a Header generating unit 1703e; passes the generated error message to an information transmitting unit 1703f; transmits the error message to the request-source terminal and finishes the process. When the received request message is valid, the control unit 1703b reads the URI table 1331 by requesting the IO 405g. The control unit 1703b obtains the identifier of the requested content from the read URI table 1331 and the URI obtained by the request receiving unit 1703a. In the case of the above-described example, it can be seen the identifier of the content is 1. Furthermore, it is possible to obtain the URI http://192.168.0.3/VUP/0001-ait-.vup of the update-point information of the stream in the requested content.

Next, the control unit 1703b checks whether there is a transmission request for the update-point in the stream, in the information received from the request receiving unit 1703a. In the case where there is a transmission request for stream update-point information, the control unit 1703b performs the following processes. First, the control unit 1703 passes, to the update-point information obtaining unit 1703c, the URI of the update-point information of the stream obtained from the URI table 1331, and the details of the transmission request for the update-point information of the stream received from the request receiving unit 1703a.

The update-point information obtaining unit 1703c identifies, from the received URI http://192.168.0.3/VUP/0001-ait.vup of the update-point information, the file in which the update-point information is stored. Then, the update-point information obtaining unit 1703c accesses the file and checks the existence of the file. In the case where the file does not exist, update-point information obtaining unit 1703c notifies the Header generating unit 1703e that update-point information does not exist, and finishes the process. In the case where the file exists, update-point information obtaining unit 1703c passes, to the Header generating unit 1703e, the URI thereof as well as type and scope information which are values of the extension header X-Version-Request in the request message. Note that it is also possible that, when the occurrence scope of the update-point is specified by using the "scope" in the X-Version-Request, the update-point information obtaining unit 1703c reads information from the file of the update-point information, newly generates update-point information of only the update-points included in the specified section, stores the generated update-point information in the second memory 203 as a new file, and passes the URI of the file to the Header generating unit 1703e.

Next, the control unit 1703b provides, to the stream obtaining unit 1703d, the URI of the requested content and the identifier of the content. Then, the stream obtaining unit 1703d reads the attribute information table 1321 by requesting the IO 405g. Subsequently, the stream obtaining unit 1703d obtains the file name of the attribute information file of the requested content based on the identifier of the content. For example, in the attribute information table 1321 shown in FIG. 15, it can be seen that the attribute information file of the content whose identifier is 1 is 0001.attr. Next, the stream obtaining unit 1703d reads the attribute information file whose name is the obtained file name by requesting the IO 405g. From among the details of the read attribute information file, the stream obtaining unit 1703d obtains the file name where the multimedia data of the content is recorded from the FileName element and the FileTree attribute information. For example, in the case of the attribute information file shown in FIG. 14, it can be seen that the file name of the multimedia data is 0001.m2ts, and the directory in which the FileTree of the ObjectCarousel is stored is /DVR/Content/0001/Carousel1.

Next, the stream obtaining unit 1703d verifies the existence of the multimedia data of the obtained file name by requesting the IO 405g. In the case where it does not exist, the stream obtaining unit 1703d passes error details to the Header generating unit 1703e, and notifies the control unit 1703b.

In addition, the control unit 1703b checks, in the information received from the request receiving unit 1703a, whether there is an X-Tree-Base-Info which is an information request for the obtaining of the file of an application. When there is such request, the following process is carried out. First, the control unit 1703b passes, to a base point obtaining unit 1703g, the obtained content identifier, and details of the X-Tree-Base-Info. The base point obtaining unit 1703g reads the attribute information table 1321 by requesting the IO 405g. Subsequently, the base point obtaining unit 1703g reads the FileTree element of the attribute information file of the content, based on the identifier of the requested content. For example, in the case of the attribute information file shown in FIG. 14, it can be seen that the directory in which the FileTree of the ObjectCarousel is stored is /DVR/Content/0001/Carousel1. Next, the base point obtaining unit 1703g checks whether or not a FileTree exists under the obtained mount point, by requesting the IO 405g. When it exists, the base point obtaining unit 1703g passes, to the Header generating unit 1703e, the directory name specified by the FileTree element. When it does not exist, the base point obtaining unit 1703g passes a null string to the Header generating unit 1703e.

Next, the control unit 1703b requests the Header generating unit 1703e to generate a header of a response message. The Header generating unit 1703e generates the header of an HTTP response message, based on the information obtained from the respective constituent elements of the network library 405e up to this point. In other words, when multimedia data exists, the Header generating unit 1703e collects information such as the attribute information file and the file size that can be obtained by requesting the IO 405g and generates the header of the response message. In addition, in the case where update-point information exists based on the result from the update-point information obtaining unit 1703c, the Header generating unit 1703e generates the extension header X-Version-Info, based on the information received from the update-point information obtaining unit 1703c. In the case of the above-described example, the Header generating unit 1703e generates a header of a response message by adding an extension header X-Version-Info: url=http://192.168.0.3/VUP/0001-ait.vup. In the case where update-point information does not exist, the Header generating unit 1703e does not generate an X-Version-Info extension header. In addition, the Header generating unit 1703e generates the extension header X-Tree-Base-Info, based on the information received from the base point obtaining unit 1703g. In the case of the above-described example, the Header generating unit 1703e adds, to the header of the response message, an extension header X-Tree-Base-Info: directory=/DVR/Content/0001/Carousel1/. The Header generating unit 1703e passes this response message to the information transmitting unit 1703f. In the case where a null string is received from the base point obtaining unit 1703g, the Header generating unit 1703e generates the extension header X-Tree-Base-Info with no value and adds this to the header of the response message. Furthermore, in the case where nothing is received from the base point obtaining unit 1703g, the Header generating unit 1703e does not generate the extension header X-Tree-Base-Info. The response message generated in the above-described manner is passed on to the information transmitting unit 1703*f*.

Next, the control unit 1703*b* sends the response message to the request-source terminal, by requesting the information transmitting unit 1703*f*. First, the information transmitting unit 1703*f* sends, to the request-source terminal, the generated header of the response message received from the Header generating unit 1703*e*.

Next, while the control unit 1703*b* sequentially reads the multimedia data by requesting the IO 405*g*, the control unit 1703*b* transmits the read data to the request-source terminal by requesting the information transmitting unit 1703*f*.

Furthermore, in the case where the request-source terminal has specified the transmission range of the multimedia data, the control unit 1703*b*, by requesting the IO 405*g*, reads the corresponding portion of the multimedia data, collects information such as the data size of the corresponding portion, and generates the header of the response message. At this time, the header of the response message is generated by the same process as the above-mentioned. In addition, the control unit 1703*b* sends the generated response message to the request-source terminal, by requesting the information transmitting unit 1703*f*. Next, by requesting the information transmitting unit 1703*f*, the control unit 1703*b* transmits the corresponding portion of the multimedia data read by requesting the IO 405*g*, to the request-source terminal.

Note that although, in the above-described example, the respective constituent elements such as the stream obtaining unit 1703*d*, the base point obtaining unit 1703*g*, and so on, individually read the attribute information table 1321, it should go without saying that the control unit 1703*b* may read the attribute information table 1321 and pass the required information therein to the respective constituent elements.

Furthermore, although, in the above-described example, the URI for obtaining the update-point information is notified by being set in the header of the response message, the information of the update-point may be included in the header of the response message. In this case, the Header generating unit 1703*e* reads update-point information such as that shown in FIG. 18, from /DVR/Content/0001/VUP/00001-ait.vup obtained from the update-point information obtaining unit 1703*c* in particular. The Header generating unit 1703*e* refers to the read update-point information, and obtains the length of the section such as AIT and the details thereof. Then, the Header generating unit 1703*e* describes, in the extension header X-Version-Info, the length of the section by using a specifier "length", as well as the details of the section by using the specifier "bytes". For example, the Header generating unit 1703*e* generates the following extension header X-Version-Info.

X-Version-Info: type=ait; length=100; bytes=1101100100 01001 . . . 1111

Furthermore, by using the columns 1804 and 1805 in FIG. 18, it is possible to denote the byte positions for transmitting a section, when the beginning of the multimedia content is assumed to be 0. For example, the Header generating unit describes the start point and end point using a specifier "section_range", and generates the following extension header.

X-Version-Info: type=ait; section_range=5000-10000

The Java library 405 is a collection of plural Java libraries stored in the second memory 203. In the present embodiment, the Java library 405 has JMF 405*a*, the AM 405*b*, the Tuner 405*c*, the CA 405*d*, the network library 405*e*, a reproduction Lib 405*f*, the IO 405*g*, an AWT 405*h*, an SI 405*i*, the Rec 405*j*, and so on.

Since the functions of the JMF 405*a*, the AMF 405*b*, the Tuner 405*c*, the CA 405*d*, the Rec 405*j* have already been described, further description shall be omitted.

The reproduction Lib 405*f* provides the class and method of the Java language (hereafter called Java APIs) for passing, to the Java program, the identifier of the channel currently being reproduced, which is stored in the second memory 203. By using this Java API, the Java program is able to recognize the channel that is currently being reproduced.

The IO 405*g* provides, to the Java program, Java APIs for the writing of data to the second memory 203 by the Java program, or Java APIs for the reading of such written data from the second memory 203. By using this API, the Java program is able to store arbitrary data in the second memory 203. Since such stored data is not erased even when power to the multimedia data transmitting apparatus 101 is turned off, the data can be read again after power to the multimedia data transmitting apparatus 101 is turned on.

The AWT 405*h* provides Java APIs for drawing or for the reception of a key input notification from the input unit 201 by the Java program. To be more specific, these correspond to the java.awt package, java.awt.event package, and other java.awt subpackages described in "The Java class Libraries Second Edition, Volume 2" (ISBN0-201-31003-1). Here, detailed description shall be omitted.

The SI 405*i* provides Java APIs for the obtaining of channel information and electric program information by the Java program. To be more specific, there are the Java TV Specification and the like. Furthermore, the MPEG section filter API for obtaining raw binary data from an MPEG-2 transport stream currently being broadcast is defined in the OCAP Specification, and the Java application can understand and handle unique electric program data that has been transmitted.

Next, the multimedia data receiving apparatus 102 shall be described.

Figure 19:
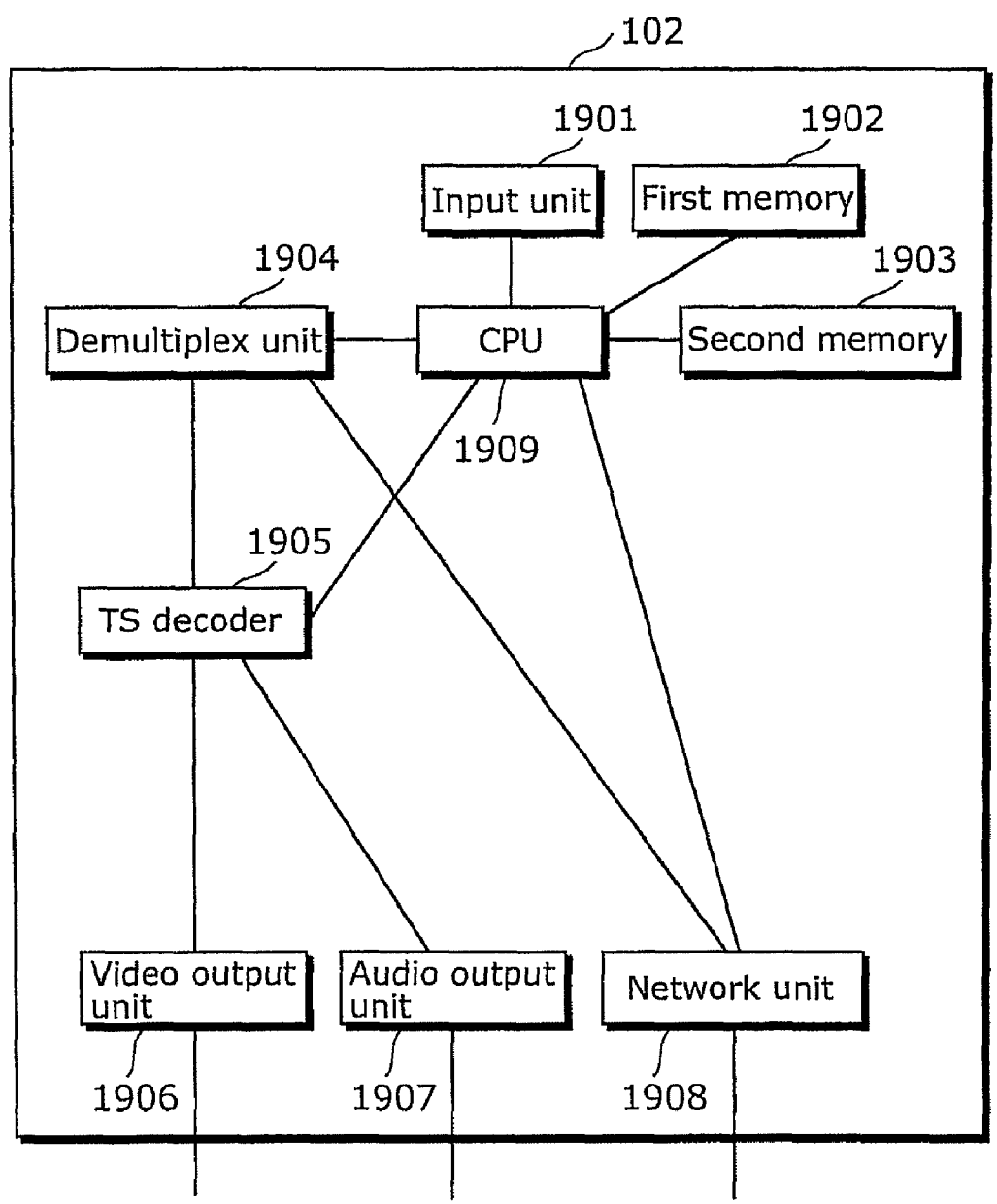
FIG. 19 is a configuration diagram for the multimedia data receiving apparatus 102 in the embodiment of the present invention.

FIG. 19 is a block diagram showing the relationship of constituent elements of the multimedia data receiving apparatus 102 in the present embodiment. The multimedia data receiving apparatus 102 includes an input unit 1901, a first memory 1902, a second memory 1903, a demultiplex unit 1904, a TS decoder 1905, a video output unit 1906, an audio output unit 1907, a network unit 1908, and a CPU 1909.

The input unit 1901, the first memory 1902, and the second memory 1903 are identical to the input unit 201, the first memory 202, and the second memory 203 of the previously described multimedia data transmitting apparatus 101 in the present embodiment. Note that the multimedia data receiving apparatus 102 stores, in the second memory 1903, TV-program information such as the identifier, title, broadcast date and time, broadcast channel, and so on, of the multimedia data in the content list, EPG data, and so on, received from the multimedia data transmitting apparatus 101.

The demultiplex unit 1904 receives an MPEG transport stream from the CPU 1909, extracts information specified by the CPU 1909 and passes the extracted information to the CPU 1909. In addition, demultiplex unit 2904 passes the MPEG transport stream to the TS decoder 1905 as it is.

The TS decoder 1905 receives the identifiers of audio data and video data from the CPU 1909. In addition, the TS decoder 1905 extracts data corresponding to the received identifiers of audio data and video data, from the stream received from the demultiplex unit 1904. The TS decoder 1905 passes extracted video data to the video output unit 1906, and the extracted audio data to the audio output unit 1907.

The video output unit 1906 and the audio output unit 1907 are identical to the video output unit 208 and the audio output unit 209, respectively, of the previously described multimedia data transmitting apparatus 101 in the present embodiment.

The network unit 1908, which includes a network interface, converts the data received from the CPU 1909 into a signal that is in accordance with the physical media of the network to which the network interface is connected to, and outputs this signal. Furthermore, the network unit 1908 receives a signal from the network interface, converts the signal into a packet defined by the IP network, and passes the packet to the CPU 1909.

The CPU 1909 controls the demultiplex unit 1904, the TS decoder 1905, and the network unit 1908 by executing a program stored in the second memory 1903.

Figure 20:
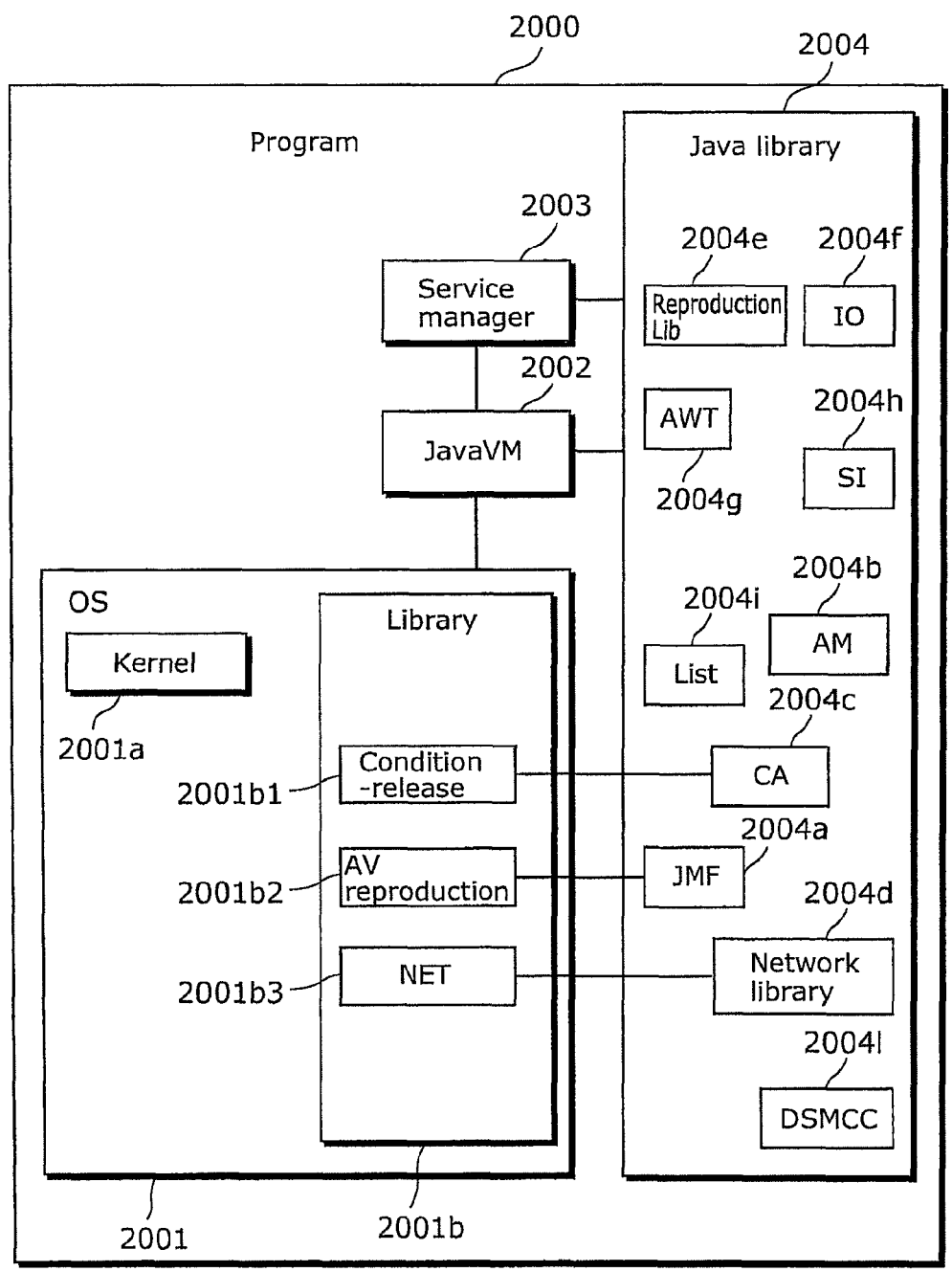
FIG. 20 is a structure diagram for the program structure stored in the multimedia data receiving apparatus 102 in the embodiment.

FIG. 20 is an example of a structure diagram of the program stored in the second memory 1903 and executed by the CPU 1909.

A program 2000 is made up of a plurality of subprograms. Specifically, it is made up of an OS 2001, a lava VM 2002, a service manager 2003, and a Java library 2004.

The OS 2001 is a subprogram activated on the CPU 1909 when power to the multimedia data receiving apparatus 102 is turned on. OS is the acronym for operating system, an example of which is Linux and the like. The OS 2001 is a generic name for publicly known technology made up of a kernel 2001*a* for executing another subprogram concurrently, and of a library 2001*b*, and therefore detailed description is omitted. In the present embodiment, the kernel 2001*a* of the OS 2001 executes the Java VM 2002 as a subprogram. Furthermore, the library 2001*b* provides these subprograms with plural functions for controlling the constituent elements held by the multimedia data receiving apparatus 102.

In the present embodiment, the library 2001*b* includes condition-release 2001*b*1, AV reproduction 2001*b*2, and NET 2001*b*3, as an example of functions.

The condition-release 2001*b*1 receives information from other subprograms or a CA 2004*c* of the Java library 2004, enables the AV reproduction 2001*b*2, and permits the reproduction of the multimedia data received from the network.

The AV reproduction 2001*b*2 receives an audio packet ID and video packet ID from the other subprograms or a JMF 2004*a* of the Java library 405. The AV reproduction 2001*b*2 then provides the received audio packet ID and video packet ID to the TS decoder 1905. As a result, the TS decoder 1905 performs filtering based on the provided packet IDs, and implements the reproduction of video/audio.

The NET 2001*b*3 creates packets of a protocol lower than the application layer defined in the IP network, for the data received from the other subprograms or a network library 2004*d* of the Java library 2004. A protocol lower than the application layer refers to, for example, a TCP packet, a UDP packet, an IP packet, and so on. By passing this to the network unit 1908, messages and data are transmitted to another device via the network 103. Furthermore, when a message is received from another device via the network 103, the NET 2001*b*3 converts the message to an application layer protocol packet and passes this packet to the other subprograms or the network library 2004*d* of the Java library 2004. An application layer protocol refers to, for example, HTTP, RTSP, RTP, and so on.

The service manager 2003 is identical to the service manager 404 of the previously described multimedia data transmitting apparatus 101 in the present embodiment except for the following points of difference. The service manager 404 receives a channel identifier from the reproduction unit 402*b* of the EPG 402; passes the identifier to the Tuner 405*c* and causes the Tuner 405*c* to perform tuning; performs descrambling by requesting the CA 405*d*, and requests the reproduction of video and audio by providing the channel identifier to the JMF 405*a*. Whereas, the service manager 2003 receives the content identifier from a List 2004*i* in the Java library 2004; passes the content identifier as well as information on the apparatus storing such content identifier, and so on, to the network library 2004*d* and receives a stream from the apparatus; then requests for the reproduction of video and audio by providing the content identifier to the JMF 2004*a* in the Java library 2004. The List 2004*i* shall be described later.

The service manager 2003 provides, to the network library 2004*d* in the Java library 2004, information such as the content identifier and the IP address of multimedia data transmitting apparatus 101. Then, the service manager 2003 requests the network library 2004*d* for the transmission of a multimedia data transmission request to the multimedia data transmitting apparatus 101. In addition, the service manager 2003 requests the network library 2004*d* for the reception of the multimedia data transmitted from the multimedia data transmitting apparatus 101. Upon receiving the request, the network library 2004*d* connects to the multimedia data transmitting apparatus 101, and issues a transmission request for the multimedia data. Subsequently, the network library 2004*d* passes the data transmitted by the multimedia data transmitting apparatus 101, to the CPU 1909.

By passing the multimedia data to the demultiplex unit 1904, the service manager 2003 carries out the reproduction of the multimedia data.

Note that with regard to trick play such as fast forward, rewind, and so on, the service manager 2003 requests trick play to the JMF 2004*a* described later, and in addition, performs trick play by requesting the network library 2004*d* to sequentially receive data necessary for trick play.

The Java library 2004 is a collection of plural Java libraries stored in the second memory 1903. In the present embodiment, the Java library 2004 includes the JMF 2004*a*, an AM 2004*b*, the CA 2004*c*, the network library 2004*d*, a reproduction Lib 2004*e*, the List 2004*i*, and so on.

The JMF 2004*a*, the AM 2004*b*, the reproduction Lib 2004*e*, an IO 2004*f*, an AWT 2004*g*, an SI 2004*h* are identical to the JMF 405*a*, the AM 405*b*, the reproduction Lib 405*f*, the IO 405*g*, the AWT 405*h*, and the SI 405*i*, respectively, which are located in the Java library 405 of the previously described multimedia data transmitting apparatus 101 in the present embodiment.

The CA 2004*c* manages rights processing of the multimedia data, such as the copy control for the multimedia data transmitted via the network 103. Copy control information may be transmitted from the multimedia data transmitting apparatus 101, the content providers such as the broadcast station 105, or an external server specified by the rights holder. Or, it may also be possible that copy control information included in the PMT in a transport stream transmitted from the multimedia data transmitting apparatus 101 is referred.

The List 2004*i* displays an EPG of the multimedia data transmitting apparatus 101 or a list of multimedia contents stored and provided by the multimedia data transmitting apparatus 101, selects one multimedia content from the list according to a user's operation accepted by the input unit 1901, and requests reproduction to the service manager 2003. At this time, information of the multimedia data transmitting apparatus 101 is also passed to the service manager 2003. Furthermore, the EPG of the multimedia data transmitting apparatus 101 and the list of contents to be provided from the multimedia data transmitting apparatus 101 can be obtained through the network library 2004d. Note that the configuration that the List 2004i is included in the network library 2004d is possible.

The network library 2004d communicates with the multimedia data transmitting apparatus 101 connected to the network 103 through the NET 2001b3 of the OS2001. The communication with the multimedia data transmitting apparatus 101 includes multimedia data list transmission/reception, multimedia data transmission request issuance and reception of the multimedia data.

Figure 21:
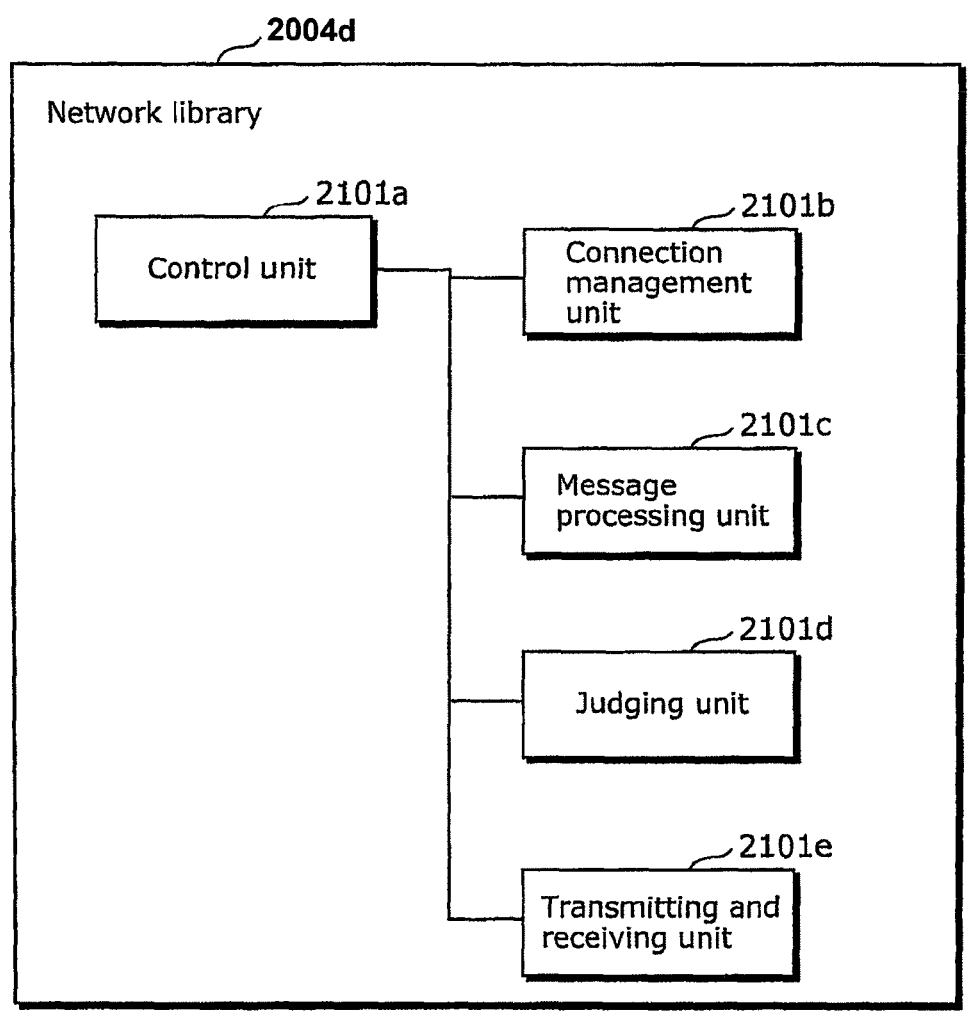
FIG. 21 is an internal configuration diagram for the network library 2004*d*.

FIG. 21 is a block diagram showing an example of the internal configuration of the network library 2004d. A network library 2004d includes a control unit 2101a, a connection management unit 2101b, a message processing unit 2101c, a judging unit 2101d, and a transmitting and receiving unit 2101e. Note that the network library 2004d may also include other functions related to the IP network.

The control unit 2101a provides Java APIs to the downloaded Java application, the service manager 2003, or other constituent elements of the Java library 2004, all of which are executed on the multimedia data receiving apparatus 102, and enables them to use the functions realized by the network library 2004d. The connection management unit 2101b operates upon a request from the control unit 2101a and manages the network connection with external devices on the network 103, such as the multimedia data transmitting apparatus 101. The message processing unit 2101c operates upon a request from the control unit 2101a and generates, based on information received from the control unit 2101a, a message to be transmitted to the external device connected through the network 103. The judging unit 2101d, which operates upon a request from the control unit 2101a, receives, from the control unit 2101a, a response message received from an external device, analyzes the response message, and notifies the details thereof to the control unit 2101a. The transmitting and receiving unit 2101e, which operates upon a request from the control unit 2101a, transmits data received from the control unit 2101a through the network connection managed by the connection management unit 2101b and received from the control unit 2101a. In addition, the transmitting and receiving unit 2101e receives data from the network connection and passes the received data to the control unit 2101a. The operation of the respective constituent units shall be described below.

First, the operation for obtaining a list of contents provided by an external device connected to the network 103 shall be described.

First, the control unit 2101a obtains a list of devices connected to the network 103, in accordance with a request from a downloaded Java application or the service manager 2003, and so on. This device list can be generated by carrying out communication defined in UPnP DA. Furthermore, the communication defined in UPnP DA includes the case of receiving an inquiry from an external device, and a case of inquiring from the multimedia data receiving apparatus 102, that is, from the control unit 2101a. In the case of receiving a notification from an external device, the control unit 2101a causes the judging unit 2101d to interpret the UPnP DA-defined message received by the transmitting and receiving unit 2101e, and obtains the details of the interpreted message. By the message, it is reported that the device like the server or the services provided by the server are available via the network 103. Next, the control unit 2101a causes the message processing unit 2101c to generate an UPnP DA-defined inquiry message for information about the sever device or the services, to the external device which sent the notification. In addition, the control unit 2101a provides the generated message to the transmitting and receiving unit 2101e and causes it to transmit the message, and to receive a response message from the server device. In addition, the control unit 2101a can get the details of the server device and the services provided by the server device, by providing the received message to the message processing unit 2101c and causing it to interpret the message. Note that the network connection used in these communications is managed by the connection management unit 2101b.

On the other hand, in the case of an inquiry from the control unit 2101a, the control unit 2101a generates a UPnP DA-defined message inquiring about the existence of a device, by requesting the message processing unit 2101c. Then, the control unit 2101a requests the transmitting and receiving unit 2101e to broadcast the generated message to the network 103. Next, by requesting the connection management unit 2101b, the control unit 2101a receives a connection request for receiving the response to the broadcasted message. When the acceptance of the connection is notified from the connection management unit 2101b, the control unit 2101a causes the transmitting and receiving unit 2101e to receive the message by requesting it. In addition, the control unit 2101a requests the judging unit 2101d to interpret the received message, and obtains the information thereof. In addition, the control unit 2101a requests the message processing unit 2101c to generate a message inquiring about the service or capability provided by the device, and requests the transmitting and receiving unit 2101e to transmit the generated message to the external device. In addition, the control unit 2101a requests the transmitting and receiving unit 2101e to receive a response message to the transmitted message, and provides the received message to the judging unit 2101d for interpretation, and obtains the details thereof. With this, the control unit 2101a can obtain information on a certain external device. By repeating such a process, a list of external devices connected to the network 103 can be obtained.

Next, the control unit 2101a obtains a list of contents provided by a specific device connected to the network 103, in accordance with a request from a downloaded Java application or the service manager 2003, and so on. Hereinafter, description is carried out with the specific external device being assumed to be the multimedia data transmitting apparatus 101.

First, the control unit 2101a generates a UPnP AV-defined content list transmission request message, by requesting the message processing unit 2101c. At this juncture, when a condition for the content is received from the Java application, and the like, the control unit 2101a generates the appropriate message by providing the condition to the message processing unit 2101c. Next, control unit 2101a provides, to the connection management unit 2101b, information such as the IP address of the multimedia data transmitting apparatus 101 provided from the Java application, and the like, and obtains information of the network connection with the multimedia data transmitting apparatus 101. Then, the control unit 2101a provides the obtained information to the transmitting and receiving unit 2101e. At this time, in the case where the network connection with the multimedia data transmitting apparatus 101 is not yet established, the connection management unit 2101b newly establishes a network connection with the multimedia data transmitting apparatus 101. Next, the control unit 2101a provides the content list transmission request message generated by the message processing unit 2101c to the transmitting and receiving unit 2101e and causes the transmitting and receiving unit 2101e to transmit the message to the multimedia data transmitting apparatus 101. In addition, the control unit 2101a requests the transmitting and receiving unit 2101e to receive a response message from the multimedia data transmitting apparatus 101. In addition, the control unit 2101a provides the received response message to the judging unit 2101d, causes the judging unit 2101d to interpret the response message, and obtains a content list which is the details of the response message. The control unit 2101a passes the obtained content list to the lava application, the service manager 2003, or the List 2004i.

Next, the process of receiving multimedia data and data related thereto, from the multimedia data transmitting apparatus 101, and reproducing such received data, in accordance with a request from a downloaded Java application or the service manager 2003, shall be described. Although the process according to a request from the service manager 2003 is exemplified below, the process is the same for the case of a request from a downloaded Java application.

First, upon receiving a multimedia data obtainment request from the service manager 2003, the control unit 2101a establishes a network connection with the multimedia data transmitting apparatus 101, by requesting the connection management unit 2101b. At this time, information such as the content identifier and the IP address of the multimedia data transmitting apparatus 101, as well as information such as the URI for accessing the content, are passed on from the service manager 2003 to the control unit 2101a. Among such information, the control unit 2101a provides the connection management unit 2101b with at least the IP address of the multimedia data transmitting apparatus 101 and the port number, and the like, for the network connection.

The connection management unit 2101b establishes the network connection with the multimedia data transmitting apparatus 101 using the information received from the control unit 2101a. Network connection means, for example, a TCP connection for performing HTTP communication in the case where multimedia data is transmitted by HTTP. Note that although in the present embodiment the IP address of the multimedia data transmitting apparatus 101 and/or the port number are provided to the connection management unit 2101b, it is also acceptable that the connection management unit 2101b is provided with URI of the data to be obtained and obtains such information by interpreting the provided URI. Furthermore, it is also acceptable that the connection management unit 2101b is provided with the content identifier and obtains such information.

Next, in order to start reproduction by the service manager 2003, the control unit 2101a accepts the section obtainment requests and file obtainment requests from the various libraries shown in FIG. 20. For example, the control unit 2101a performs the receiving of the multimedia data for AV reproduction. Furthermore, when trick play is performed on the multimedia data receiving apparatus 102, the reception requests for PAT, PMT, and a file transmitted by DSMCC is required. This is because, during the trick play, there are some cases where not all the TS streams of the multimedia data are received and it may happen that, at the timing in which the JMF 2004a, the AM 2004b, or the DSMCC 2004l, and so on, need to use the PAT and PMT, these section data or DSMCC file do not exist on the multimedia data receiving apparatus 102.

Next, in order to transmit the request for the obtainment of these information to the multimedia data transmitting apparatus 101, the control unit 2101a generates a corresponding HTTP request message by requesting the message processing unit 2101c.

The message processing unit 2101c sets the URI of the requested multimedia data in the HTTP request. For example, the following shows the HTTP request in which the URI of the multimedia data is http://192.168.0.3/AVData/0001.m2ts, and to which is set an extension header X-Version-Request for requesting update-point information within a stream in preparation for the trick play.

GET http://192.168.0.3/AVData/0001.m2ts HTTP/1.1
Host: 192.168.0.3
Date: Thr Jan 11 15:00:00 2007 GMT
User-Agent: AVT Client
Connection: Keep-Alive
X-Version-Request: type=ait; scope=all Note that, during the trick play, the request is carried out using a method which specifies the specific section of the multimedia content that is required. This can be performed by using the Range header of HTTP. Furthermore, in the same manner, a header specifying the occurrence scope of the update-point is generated.

X-Version-Request: type=ait; scope=47940-95879

For example, during the trick play, when there is an update-point in a section of the stream that was not obtained, this extension header can be used for obtaining such section.

Next, the control unit 2101a provides the HTTP request generated in the above-described manner to the transmitting and receiving unit 2101e and causes the transmitting and receiving unit 2101e to transmit the HTTP request to the multimedia data transmitting apparatus 101.

Next, the control unit 2101a requests the transmitting and receiving unit 2101e to receive an HTTP response from the multimedia data transmitting apparatus 101. An example of the received HTTP response is shown below.

HTTP/1.1 200 OK
Date: Thr Jan 11 15:00:01 2007 GMT
Server: AVT Server
Connection: Keep-Alive
Content-Type: video/mpeg
Content-Length: 47952
X-Version-Info: type=ait; url=http://192.168.0.3/VUP/0001-ait.vup
(Empty line)
[47952-byte data]

Subsequently, the control unit 2101a passes the received HTTP response message to the judging unit 2101d and requests interpretation of it.

First, the judging unit 2101d checks the response code of the HTTP response. When the result is 200 OK, this is provided to the control unit 2101a. Then, the control unit 2101a passes, to the service manager 2003, the received multimedia data in the body portion of the HTTP response, and reproduction is performed.

In addition, the judging unit 2101d checks whether an extension header X-Version-Info, which indicates update-point information in the stream, exists. In the case where an extension header X-Version-Info exists as in the above-described example, the judging unit 2101d notifies the details of the header to the control unit 2101a. Then, the control unit 2101a generates and transmits, to the multimedia data transmitting apparatus 101, a message for the update-point information obtainment, by requesting the message processing unit 2101c and the transmitting and receiving unit 2101e, respectively, and in addition, receives the stream update-point information specified by the multimedia data transmitting apparatus 101, by requesting the transmitting and receiving unit 2101e. Subsequently, the control unit 2101a passes the received update-point information to the SI 2004h. In the case where an extension header X-Version-Info does not exist, the control unit 2101a is merely notified by the judging unit 2101d of the fact that an extension header X-Version-Info does not exist.

The SI 2004*h* notifies the version up of the section data to the requested Java library according to the received update-point information, during the reproduction of the received multimedia data. With this, the Java application or service manager 2003, or the Java library is able to perform the appropriate processing corresponding to the version up of the section data. For example, in the case where there is a need to start a new application, it becomes possible to detect the timing for the activation and the like. Therefore, an application can be started at the appropriate timing. In the case where it is necessary to obtain a file from the multimedia data transmitting apparatus 101 in order to start an application, it is possible to obtain the file by using the above-described extension header X-Tree-Base-Request and the extension header X-Tree-Base-Info. In other words, the control unit 2101*a* generates a multimedia data transmission request message with the extension header X-Tree-Base-Request by requesting the message processing unit 2101*c*, and transmits the message to the multimedia data transmitting apparatus 101 by providing the message to the transmitting and receiving unit 2101*e*. Subsequently, the control unit 2101*a* receives the response message thereto, through the transmitting and receiving unit 2101*e*, and passes the received response message to the judging unit 2101*d*. The judging unit 2101*d* further checks whether the extension header X-Tree-Base-Info is included and, when included, notifies the control unit 2101*a* of the extension header. Upon receiving a request for file obtainment from the lava application or the service manager 2003, the control unit 2101*a* receives the file from the multimedia data transmitting apparatus 101 in the above-described manner, using the values of the notified X-Tree-Base-Info.

As described above, on the multimedia data receiving apparatus 102, update-points in a stream can be detected correctly, and content, including data broadcast, can be properly reproduced, even when trick play is performed.

Note that although an example is given here in which the SI 2004*h* manages the timing for version up, this function may be implemented by another library as long as it is possible to perform the appropriate processing such as version up notification, and so on, by taking the correspondence of the content viewing position and the received update-point information during the multimedia reproduction.

(Other Modifications)

Although the present invention is described based on the above-mentioned embodiments, it should be obvious that the present invention is not limited to such above-mentioned embodiments. The present invention also includes such cases as described below.

(1) Although, in the above-described embodiment, HTTP is used as the content data transmitting protocol, other protocols, such as RTP/RTSP, may be used.

(2) Although, in the above-described embodiment, only video content in the MPEG2-TS format is described, it goes without saying that the same processing can also be performed on video content in other coding formats and other types of content such as music.

(3) Although, in the above-described embodiment, transmission of the update-point of the stream is performed by being transmitted from the multimedia data transmitting apparatus 101 which is a server, in response to a request from the multimedia data receiving apparatus 102 which is a client, the stream update-point may also be transmitted from the server without the request from the client.

(4) Although, in the above-described embodiment, the extension header X-Version-Request and the extension header X-Version-Info are defined, it goes without saying that the present invention is not limited to such format as long as equivalent information can be transmitted. For example a Pragma header field may be used. In this case, by using getVersionInfoURI as the transmission request pragma-directive, and adopting versionInfoURI for the URI notification pragma-directive, the transmission request can be implemented by adding the following header to the request message.

Pragma: getVersionInfoURI

Furthermore, the URI can be notified by adding the following header to the response message.

Pragma: versionInfoURI="http://192.168.0.3/VUP/0001-ait.vup"

In the case where the update-point occurring in the specific section, or in the case of obtaining update-point information of the specific section data only, such Pragma-directive of Pragma header field like above may be added, and may also be used together with the aforementioned extension header X-Version-Request and extension header X-Version-Info. Furthermore, the Pragma header field may be used as a response to a request including the extension header X-Version-Request.

(5) Although, in the present embodiment, the transmission request for update-point information is issued included in the transmission request for multimedia data, update-point information communication may be performed independently of multimedia data communication. Furthermore, although in the present embodiment, the transmission request for update-point information is transmitted by being included in the header of an HTTP-GET request, communication for only the update-point information may be performed using an HTTP-HEAD request, or the like, which does not involve data transmission and reception.

(6) Although, in the present invention, the multimedia data transmitting apparatus notifies the update-point information within a range specified by the multimedia data receiving unit, it is also possible that the multimedia data transmitting apparatus notifies the update-points for the specified section in the case where the multimedia data receiving apparatus specifies the section by using a Range header field and the like and obtains data of only the specified section of the multimedia data. Alternatively, it is also possible that the multimedia data transmitting apparatus notifies the update-points before or after the specified section. Furthermore, in the case where the multimedia data receiving apparatus successively issues transmission requests with specifying the section, it is also possible that the multimedia data transmitting apparatus notifies the update-points between the preceding requested section and the current requested section.

(7) A part or all of the constituent elements making up each of the above-mentioned apparatuses may be made from one system LSI (Large Scale Integration circuit). The system LSI is a super multi-function LSI that is manufactured by integrating plural components in one chip, and is specifically a computer system which is configured by including a microprocessor, a ROM, a RAM, and so on. A computer program is stored in the RAM. The system LSI accomplishes its functions through the operation of the microprocessor in accordance with the computer program.

(8) A part or all of the constituent elements making up each of the above-mentioned apparatuses may be made from an IC card that can be attached to/detached from each apparatus, or a stand-alone module. The IC card or the module is a computer system made from a microprocessor, a ROM, a RAM, and so on. The IC card or the module may include the super multi-function LSI. The IC card or the module accomplishes its functions through the operation of the microprocessor in accordance with the computer program. The IC card or the module may also be tamper-resistant.

(9) The multimedia data transmitting apparatus and the multimedia data receiving apparatus of the present invention may also be the above-described methods. The present invention may also be a computer program for executing such methods through a computer, or as a digital signal made from the computer program.

Furthermore, the multimedia data transmitting apparatus and the multimedia data receiving apparatus of the present invention may be a computer readable recording medium on which the computer program or the digital signal is recorded, such as a flexible disc, a hard disc, a CD-ROM, an MO, a DVD, a DVD-ROM, a DVD-RAM, a Blu-ray Disc (BD), a semiconductor memory, and so on. Furthermore, the multimedia data transmitting apparatus and the multimedia data receiving apparatus of the present invention may also be the computer program or the digital signal recorded on such recording media.

Furthermore, the multimedia data transmitting apparatus and the multimedia data receiving apparatus of the present invention may also be the computer program or the digital signal transmitted via an electrical communication line, a wireless or wired communication line, a network represented by the internet, a data broadcast, and so on.

Furthermore, the multimedia data transmitting apparatus and the multimedia data receiving apparatus of the present invention may also be a computer system including a microprocessor and a memory, with the memory storing the computer program and the microprocessor operating in accordance with the computer program.

Furthermore, the present invention may also be implemented in another independent computer system by recording the program or digital signal on the recording medium and transferring the recording medium, or by transferring the program or the digital signal via the network, and the like.

(10) It is also possible to combine the above-described embodiment and the aforementioned variations.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

With the multimedia data transmitting apparatus, the multimedia data receiving apparatus, and the multimedia content communication system configured thereof according to the present invention, in the case where a multimedia server transmits multimedia data in response to a request from a client, in the sharing of multimedia content using a home network, update-point information within a stream is transmitted together with the multimedia data. With this, in the case where the client performs trick play, update-points of the stream can be known even without receiving all data of a TS stream from the server. Therefore, there is a remarkable effect of enabling the proper performance of application activation, and so on, which requires proper timing, and reproduction of multimedia content including data broadcast, even at the client. As such, the present invention is useful as a server apparatus, a receiving terminal, and a multimedia data communication method in a networked environment such as in a home network.

What is claimed is:

1. A multimedia data transmitting apparatus which transmits stored multimedia data to a multimedia data receiving apparatus via a network in response to a transmission request from the multimedia data receiving apparatus, said multimedia data transmitting apparatus comprising:
  a storage in which the multimedia data and an update-point information of a stream included in the multimedia data are stored;
  a request receiver that receives, from the multimedia data receiving apparatus, a transmission request message, the transmission request message requesting transmission of the multimedia data and transmission of the update-point information of the stream included in the multimedia data which are stored in said storage;
  an update-point information obtainer that obtains the update-point information of the stream, from the stream included in the multimedia data stored in said storage; and
  an information transmitter that transmits requested multimedia data and the update-point information of the stream included in the multimedia data, to the multimedia data receiving apparatus,
  wherein the update-point information of the stream includes update details of first data representing a structure of the stream included in the multimedia data and one of position information indicating a position in the stream at which the update details of the first data become valid and time information indicating a time in the stream at which the update details of the first data become valid, and
  wherein, when the request receiver receives the transmission request message specifying a reproduction speed that is faster than a specified reproduction speed, said information transmitter:
  transmits, to the multimedia data receiving apparatus, portions of the stream included in the multimedia data, as a stream that is required for reproduction according to the reproduction speed that is faster than the specified reproduction speed; and
  transmits the update-point information of the stream included in the multimedia data, when the reproduction speed specified in the transmission request message for the multimedia data becomes the specified reproduction speed.

2. The multimedia data transmitting apparatus according to claim 1,
  wherein said update-point information obtainer includes:
  an update-point detector that detects the update-point information of the stream included in the multimedia data; and
  an update-point storage in which the update-point information of the stream detected by said update-point detector is stored, and
  said update-point detector detects, when the multimedia data is to be stored, the update-point information of the stream included in the multimedia data to be stored.

3. The multimedia data transmitting apparatus according to claim 1,
  wherein said update-point information obtainer includes:
  an update-point detector that detects the update-point information of the stream included in the multimedia data; and
  an update-point storage in which the update-point information of the stream, detected by said update-point detector, is stored, and
  said update-point detector detects, when the transmission request message is received, the update-point information of the stream included in the multimedia data to be stored.

4. The multimedia data transmitting apparatus according to claim 1,
   wherein, when said request receiver receives the transmission request message from the multimedia data receiving apparatus, said update-point information obtainer obtains the update-point information of the stream included in the multimedia data, and said information transmitter transmits the obtained update-point information of the stream.

5. The multimedia data transmitting apparatus according to claim 1,
   wherein, when said request receiver receives the transmission request message specifying a reproduction speed that is faster than a specified reproduction speed, said information transmitter:
   transmits, to the multimedia data receiving apparatus, portions of the stream included in the multimedia data, as a stream that is required for reproduction according to the reproduction speed that is faster than the specified reproduction speed; and
   transmits the update-point information of the stream included in the multimedia data, before the reproduction speed specified in the transmission request message for the multimedia data becomes the specified reproduction speed.

6. The multimedia data transmitting apparatus according to claim 1,
   wherein said information transmitter transmits reference information for the update-point information of the stream stored by said multimedia data transmitting apparatus.

7. The multimedia data transmitting apparatus according to claim 1,
   wherein the update-point information to be transmitted to the multimedia data receiving apparatus is difference data indicating a difference, before updating and after updating, in data of which details are updated over time, among data other than an audio stream and a video stream.

8. The multimedia data transmitting apparatus according to claim 1,
   wherein the update-point information to be transmitted to the multimedia data receiving apparatus represents information which has been updated within the stream.

9. The multimedia data transmitting apparatus according to claim 1,
   wherein the update-point information of the stream includes the update details of the first data representing the structure of the stream for specified sections included in the multimedia data to be transmitted by said information transmitter and one of the position information indicating a position in the stream at which the update details of the first data become valid and the time information indicating a time in the stream at which the update details of the first data become valid.

10. The multimedia data transmitting apparatus according to claim 1,
    wherein the update-point information of the stream includes the update details of the first data representing the structure of the stream for a specified section included in the multimedia data and specified in the transmission request message and one of the position information indicating a position in the stream at which the update details of the first data become valid and the time information indicating a time in the stream at which the update details of the first data become valid.

11. The multimedia data transmitting apparatus according to claim 1,
    wherein the transmission request message from the multimedia data receiving apparatus includes information for requesting transmission of the update-point information of the stream.

12. The multimedia data transmitting apparatus according to claim 1,
    wherein said information transmitter transmits the update-point information of the stream by including the update-point information in a response message to the transmission request message from the multimedia data receiving apparatus.

13. The multimedia data transmitting apparatus according to claim 1, further comprising:
    a Java executer that executes a Java application; and
    a configuration changer that changes a configuration of the update-point information of the stream, according to an instruction from the Java application.

14. A multimedia data receiving apparatus which receives multimedia data and update-point information of a stream included in the multimedia data, from a multimedia data transmitting apparatus, said multimedia data receiving apparatus comprising:
    a receiver that receives the multimedia data and the update-point information of the stream included in the multimedia data; and
    a reproduction controller that controls one of starting and changing of a reproduction processing for the multimedia data, according to the update-point information of the stream,
    wherein the update-point information of the stream includes update details of first data representing a structure of the stream included in the multimedia data, and one of position information indicating a position in the stream at which the update details of the first data become valid and time information indicating a time in the stream at which the update details of the first data become valid.

15. The multimedia data receiving apparatus according to claim 14,
    wherein said receiving apparatus receives the update-point information included in a response message to a transmission request message for the multimedia data, received from the multimedia data transmitting apparatus.

16. The multimedia data receiving apparatus according to claim 14, further comprising:
    a transmitter that transmits a transmission request message for requesting transmission of the multimedia data and transmission of the update-point information of the stream included in the multimedia data,
    wherein said receiver receives the multimedia data and the update-point information of the stream, through transmission of the transmission request message from said transmitter to the multimedia data transmitting apparatus.

17. The multimedia data receiving apparatus according to claim 14, further comprising:
    a Java executer that executes a Java application; and
    an update-point notifier that notifies the Java application of the received update-point information of the stream, the Java application being executed by said Java executer,
    wherein said reproduction controller performs one of starting and changing a reproduction processing for the multimedia data depending on the received update-point information of the stream, according to an instruction from the Java application.

* * * * *